US012795428B2

(12) United States Patent
Sen et al.

(10) Patent No.: US 12,795,428 B2
(45) Date of Patent: Nov. 10, 2026

(54) HANDLING OF CONTINUOUS SECONDARY gNB ADDITION FAILURE REQUESTS AND SECONDARY CELL GROUP FAILURES FROM A SAME 5G NEW RADIO CELL

(71) Applicant: TELEFONAKTIEBOLAGET LM ERICSSON (PUBL), Stockholm (SE)

(72) Inventors: Ayan Sen, Bangalore (IN); Deepak Gupta, Noida (IN); Surajit Mondal, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 18/580,149

(22) PCT Filed: Jul. 19, 2021

(86) PCT No.: PCT/IN2021/050695
§ 371 (c)(1),
(2) Date: Jan. 17, 2024

(87) PCT Pub. No.: WO2023/002494
PCT Pub. Date: Jan. 26, 2023

(65) Prior Publication Data

US 2024/0334229 A1 Oct. 3, 2024

(51) Int. Cl.
*H04W 24/10* (2009.01)
*H04B 17/318* (2015.01)
*H04W 36/00* (2009.01)

(52) U.S. Cl.
CPC .......... *H04W 24/10* (2013.01); *H04B 17/328* (2023.05); *H04W 36/0079* (2018.08)

(58) Field of Classification Search
CPC . H04W 24/10; H04W 36/0079; H04W 24/08; H04W 76/19; H04W 76/15; H04W 76/18; H04W 76/30; H04B 17/328
See application file for complete search history.

(56) References Cited

U.S. PATENT DOCUMENTS

| | | | | |
|---|---|---|---|---|
| 11,051,186 | B1 * | 6/2021 | Pawar .................. | H04W 64/00 |
| 11,064,372 | B1 * | 7/2021 | Marupaduga ......... | H04W 76/18 |
| 2020/0344630 | A1 | 10/2020 | Jha et al. | |

FOREIGN PATENT DOCUMENTS

WO 2014024123 A1 2/2014

OTHER PUBLICATIONS

"Efficient Algorithm to Reduce Power Consumption for EUTRA-New Radio Dual Connectivity RAN Parameter Measurements in 5G" by Jha et al, IEEE Xplore, whole document (Year: 2020).*
Xplore publication (Year: 2020).*

(Continued)

*Primary Examiner* — Thai Nguyen

(57) ABSTRACT

A 4G network node (and a method implemented thereby) and a terminal node (and a method implemented thereby) are described herein, all of which are configured to improve the probability of a SCG bearer setup by allowing the setup request to be sent to an alternative candidate SgNB (NR cell), in case it exists, instead of repeatedly persisting with the initial candidate SgB (BNR cell) after experiencing a predetermined number of SgNB addition request rejections or SCG failures.

18 Claims, 32 Drawing Sheets

(56) References Cited

OTHER PUBLICATIONS

3GPP TS 36.331 V16.0.0 (Mar. 2020), 3rd Generation Partnership Project; Technical Specification Group Radio Access Network; Evolved Universal Terrestrial Radio Access (E-UTRA); Radio Resource Control (RRC); Protocol specification (Release 16), upload date Apr. 6, 2020.

3GPP TS 36.423 V15.10.0 (Jul. 2020), 3rd Generation Partnership Project; Technical Specification Group Radio Access Network; Evolved Universal Terrestrial Radio Access Network (E-UTRAN); X2 application protocol (X2AP) (Release 15), upload date Jul. 17, 2020.

3GPP TS 37.340 V15.9.0 (Jul. 2020), 3rd Generation Partnership Project; Technical Specification Group Radio Access Network; Evolved Universal Terrestrial Radio Access (E-UTRA) and NR; Multi-connectivity; Stage 2 (Release 15), upload date Jul. 24, 2020.

3GPP TS 38.331 V15.10.0 (Jul. 2020), 3rd Generation Partnership Project; Technical Specification Group Radio Access Network; NR; Radio Resource Control (RRC) protocol specification (Release 15), upload date Jul. 24, 2020.

* cited by examiner

FIG. 5A
(PRIOR ART)

500

| time | cell | ueRef | direction | type | message | parameters | FIG. 4's STEPS |
|---|---|---|---|---|---|---|---|
| 9/13/2019 5:29:59.780 | 136820256 | 273445027 | ENB <-- UE | RRC | MeasurementReport | measId:12 PCell:{rsrp:-101,rsrq:-11.5} phCellId:10 phCellId:9 NeighCells:{rsrp:-96,rsrp:-100,rsrq-12.0,rsrq:-17}.0 | 1. |
| 9/13/2019 5:29:59.785 | 136820256 | 273445027 | ENB --> TENB | X2AP | SgNBAdditionRequest | ipAddr:174.101.8.132 ipAddr:173.1.0.129 plmnIdentity:505-01 enbId:534454 cellId:32 e-RAB-ID:5 gTP-TEID:5AA1DF2F'H gTP-TEID:4830ADEA'H | 2. |
| 9/13/2019 5:29:59.785 | 136820256 | 273445027 | ENB --> TENB | NR_RRC | CG-ConfigInfo | physCellId:10 ssbFrequency:636834 | |
| 9/13/2019 5:29:59.785 | 136820256 | 273445027 | ENB --> TENB | NR_RRC | UE-NR-Capability | | |
| 9/13/2019 5:29:59.785 | 136820256 | 273445027 | ENB --> TENB | NR_RRC | UE-MRDC-Capability | | |
| 9/13/2019 5:29:59.791 | 136820256 | 273445027 | ENB <-- TENB | X2AP | SgNBAdditionRequestReject | cause:radioNetwork:unspecified UE-X2AP-ID:1350 | 3. |
| 9/13/2019 5:29:59.799 | 136820256 | 273445027 | ENB <-- UE | RRC | MeasurementReport | measId:12 PCell:{rsrp:-101,rsrq:-11.5} phCellId:10 phCellId:9 NeighCells:{rsrp:-97,rsrp:-102,rsrq:-13.0,rsrq:-16.0} | 1. |
| 9/13/2019 5:29:59.965 | 136820256 | 273445027 | ENB <-- UE | RRC | MeasurementReport | measId:12 PCell:{rsrp:-101,rsrq:-11.0} phCellId:10 phCellId:9 NeighCells:{rsrp:-97,rsrp:-102,rsrq:-13.0,rsrq:-16.0} | 1. |
| 9/13/2019 5:29:59.970 | 136820256 | 273445027 | ENB --> TENB | X2AP | SgNBAdditionRequest | ipAddr:174.101.8.132 ipAddr:173.1.0.129 plmnIdentity:505-01 enbId:534454 cellId:32 e-RAB-ID:5 gTP-TEID:17253800'H gTP-TEID:4830ADEA'H | 2. |
| 9/13/2019 5:29:59.970 | 136820256 | 273445027 | ENB --> TENB | NR_RRC | CG-ConfigInfo | physCellId:10 ssbFrequency:636834 | |
| 9/13/2019 5:29:59.970 | 136820256 | 273445027 | ENB --> TENB | NR_RRC | UE-NR-Capability | | |

TO FIG. 5B

FIG. 5B
(PRIOR ART)

FROM FIG. 5A

| | | | | | | | FIG. 4's STEPS |
|---|---|---|---|---|---|---|---|
| 9/13/2019 5:29:59.970 | 136820256 | 273445027 | ENB --> TENB | NR_RRC | UE-MRDC-Capability | | |
| 9/13/2019 5:29:59.976 | 136820256 | 273445027 | ENB <-- TENB | X2AP | SgNBAdditionRequestReject | cause:radioNetwork:unspecified UE-X2AP-ID:1350 | 3. |
| 9/13/2019 5:30:00.039 | 136820256 | 273445027 | ENB <-- UE | RRC | MeasurementReport | measId:12 PCell:{rsrp:-101,rsrq:-10.5} phCellId:10 phCellId:9 NeighCells:{rsrp:-97,rsrp:-102,rsrq:-13.0,rsrq:-16.0} | 1. |
| 9/13/2019 5:30:00.045 | 136820256 | 273445027 | ENB --> TENB | X2AP | SgNBAdditionRequest | ipAddr:174.101.8.132 ipAddr:173.1.0.129 plmnIdentity:505-01 enbId:534454 cellId:32 e-RAB-ID:5 gTP-TEID:46C58A8A'H gTP-TEID:4830ADEA'H | 2. |
| 9/13/2019 5:30:00.045 | 136820256 | 273445027 | ENB --> TENB | NR_RRC | CG-ConfigInfo | physCellId:10 ssbFrequency:636834 | |
| 9/13/2019 5:30:00.045 | 136820256 | 273445027 | ENB --> TENB | NR_RRC | UE-NR-Capability | | |
| 9/13/2019 5:30:00.045 | 136820256 | 273445027 | ENB --> TENB | NR_RRC | UE-MRDC-Capability | | |
| 9/13/2019 5:30:00.054 | 136820256 | 273445027 | ENB <-- TENB | X2AP | SgNBAdditionRequestReject | cause:radioNetwork:unspecified UE-X2AP-ID:1350 | 3. |
| 9/13/2019 5:30:00.269 | 136820256 | 273445027 | ENB <-- UE | RRC | MeasurementReport | measId:12 PCell:{rsrp:-101,rsrq:-10.0} phCellId:10 phCellId:9 NeighCells:{rsrp:-97,rsrp:-102,rsrq:-13.0,rsrq:-16.0} | 1. |
| 9/13/2019 5:30:00.276 | 136820256 | 273445027 | ENB --> TENB | X2AP | SgNBAdditionRequest | ipAddr:174.101.8.132 ipAddr:173.1.0.129 plmnIdentity:505-01 enbId:534454 cellId:32 e-RAB-ID:5 gTP-TEID:7389B97'H gTP-TEID:4830ADEA'H | 2. |

TO FIG. 5C

FROM FIG. 5B

| | | | | | | | FIG. 4's STEPS |
|---|---|---|---|---|---|---|---|
| 9/13/2019 5:30:00.276 | 136820256 | 273445027 | ENB --> TENB | NR_RRC | CG-ConfigInfo | physCellId:10 ssbFrequency:636834 | |
| 9/13/2019 5:30:00.276 | 136820256 | 273445027 | ENB --> TENB | NR_RRC | UE-NR-Capability | | |
| 9/13/2019 5:30:00.276 | 136820256 | 273445027 | ENB --> TENB | NR_RRC | UE-MRDC-Capability | | |
| 9/13/2019 5:30:00.283 | 136820256 | 273445027 | ENB <-- TENB | X2AP | SgNBAdditionRequestReject | cause:radioNetwork:unspecified UE-X2AP-ID:1350 | 3. |
| 9/13/2019 5:30:00.287 | 136820256 | 273445027 | ENB <-- UE | RRC | MeasurementReport | measId:12 PCell:{rsrp:-101,rsrq:-10.5} phCellId:10 phCellId:9 NeighCells:{rsrp:-95,rsrp:-103,rsrq:-12.0,rsrq:-18.0} | 1. |
| 9/13/2019 5:30:00.509 | 136820256 | 273445027 | ENB <-- UE | RRC | MeasurementReport | measId:12 PCell:{rsrp:-101,rsrq:-11.0} phCellId:10 phCellId:9 NeighCells:{rsrp:-95,rsrp:-103,rsrq:-12.0,rsrq:-18.0} | 1. |
| 9/13/2019 5:30:00.514 | 136820256 | 273445027 | ENB --> TENB | X2AP | SgNBAdditionRequest | ipAddr:174.101.8.132 ipAddr:173.1.0.129 plmnIdentity:505-01 enbId:534454 cellId:32 e-RAB-ID:5 gTP-TEID:C7B63CB0'H gTP-TEID:4830ADEA'H | 2. |
| 9/13/2019 5:30:00.514 | 136820256 | 273445027 | ENB --> TENB | NR_RRC | CG-ConfigInfo | physCellId:10 ssbFrequency:636834 | |
| 9/13/2019 5:30:00.514 | 136820256 | 273445027 | ENB --> TENB | NR_RRC | UE-NR-Capability | | |
| 9/13/2019 5:30:00.514 | 136820256 | 273445027 | ENB --> TENB | NR_RRC | UE-MRDC-Capability | | |
| 9/13/2019 5:30:00.521 | 136820256 | 273445027 | ENB <-- TENB | X2AP | SgNBAdditionRequestReject | cause:radioNetwork:unspecified UE-X2AP-ID:1350 | 3. |
| 9/13/2019 5:30:00.528 | 136820256 | 273445027 | ENB <-- UE | RRC | MeasurementReport | measId:12 PCell:{rsrp:-101,rsrq:-10.5} phCellId:10 phCellId:9 NeighCells:{rsrp:-95,rsrp:-103,rsrq:-12.0,rsrq:-18.0} | 1. |

FIG. 5C
(PRIOR ART)

FIG. 7A
(PRIOR ART)

700

| time | cell | ueRef | direction | type | message | parameters | FIG. 6's STEPS |
|---|---|---|---|---|---|---|---|
| 16:44:37.573 | 22948623 | 126754935 | ENB <-- UE | RRC | MeasurementReport | measId:4(B1) PCell:{rsrp:-89,rsrq:-9.5} phCellId:121 phCellId:122 NeighCells:{rsrp:-105, rsrp:-107,rsrq:-14.0,rsrq:-16.0} | 1. |
| 16:44:37.577 | 22948623 | 126754935 | ENB --> TENB | X2AP | SgNBAdditionRequest | ipAddr:10.79.74.26 ipAddr:10.164.27.94 plmnIdentity:208-01 enbId:89643 cellId:15 e-RAB-ID:7 gTP-TEID:CC1F5295'H gTP-TEID:80204 | 2. |
| 16:44:37.577 | 22948623 | 126754935 | ENB --> TENB | NR_RRC | CG-ConfigInfo | physCellId:121 ssbFrequency:647040 | |
| 16:44:37.577 | 22948623 | 126754935 | ENB --> TENB | NR_RRC | UE-NR-Capability | | |
| 16:44:37.577 | 22948623 | 126754935 | ENB --> TENB | NR_RRC | UE-MRDC-Capability | | |
| 16:44:37.591 | 22948623 | 126754935 | ENB <-- TENB | X2AP | SgNBAdditionRequestAcknowledge | Addr:10.79.68.7 ipAddr:10.79.68.7 ipAddr:10.79.68.7 e-RAB-ID:7 gTP-TEID:F09D2E26'H gTP-TEID:106247D9'H gTP-TEID:B640734B'H | 3. |
| 16:44:37.591 | 22948623 | 126754935 | ENB <-- TENB | NR_RRC | CG-Config | logicalChannelIdentity: 1 drb_identity:4 logicalChannelGroup:5 physCellId:121 ssbFrequency:647040 | |
| 16:44:37.596 | 22948623 | 126754935 | ENB --> TENB | X2AP | SNStatusTransfer | e-RAB-ID:7 SgNB-UE-X2AP-ID:774994 UE-X2AP-ID:2530 UE-X2AP-ID:0 | 3. |

TO FIG. 7B

FIG. 7B
(PRIOR ART)

FROM FIG. 7A

| | | | | | | | FIG. 6's STEPS |
|---|---|---|---|---|---|---|---|
| 16:44:37.597 | 22948623 | 126754935 | ENB --> UE | RRC | RRCConnectionReconfiguration | targetPhysCellId:488 logicalChannelIdentity:3 logicalChannelIdentity:4 eps-BearerIdentity:6 eps-BearerIdentity:7 logicalChannelGroup: :eventA2 trigQnt:rsrp thresholdRsrp:23 :eventA3 a3Offset:7 trigQnt:rsrp measId:1(A3) measId:2(A2) measId:3(A3) ra-PreambleIndex: MIMO | 4. |
| 16:44:37.597 | 22948623 | 126754935 | ENB --> UE | NR_RRC | RRCReconfiguration | logicalChannelIdentity: 1 drb_identity:4 logicalChannelGroup:5 physCellId:121 ssbFrequency:647040 | |
| 16:44:37.597 | 22948623 | 126754935 | ENB --> UE | NR_RRC | RadioBearerConfig | | |
| 16:44:37.683 | 22948623 | 126754935 | ENB <-- UE | RRC | RRCConnectionReconfigurationComplete | | 5. |
| 16:44:37.683 | 22948623 | 126754935 | ENB <-- UE | NR_RRC | RRCReconfigurationComplete | | |
| 16:44:37.684 | 22948623 | 126754935 | ENB --> TENB | X2AP | SgNBReconfigurationComplete | sgNB-UE-X2AP-ID:774994 UE-X2AP-ID:2530 | 6. |
| 16:44:37.684 | 22948623 | 126754935 | ENB --> TENB | NR_RRC | RRCReconfigurationComplete | | |
| 16:44:37.684 | 22948623 | 126754935 | ENB --> CN | S1AP | E-RABModificationIndication | ipAddr:10.79.68.7 ipAddr:10.79.74.26 mmeUeS1apId:54179097 enbEuS1apId:271785 e-RAB-ID:7 e-RAB-ID:6 | |

TO FIG. 7C

FIG. 7C
(PRIOR ART)

FROM FIG. 7B

| | | | | | | | FIG. 6's STEPS |
|---|---|---|---|---|---|---|---|
| 16:44:37.692 | 22948623 | 126754935 | ENB <-- CN | S1AP | E-RABModificationConfirm | mmeUeS1apId:54179097 enbUeS1apId:271785 e-RAB-ID:7 | |
| 16:44:38.645 | 22948623 | 126754935 | ENB <-- UE | RRC | RRC_SCG_FAILURE_INFORMATION_NR | LTEEvent:,esId271785,msid:54179097 | 7. |
| 16:44:38.648 | 22948623 | 126754935 | ENB --> TENB | X2AP | SgNBReleaseRequest | ipAddr:10.79.74.26 e-RAB-ID:7 gtp-TEID:53ACFF93'H cause:radioNetwork:radio-connection-with-UE-lost SgNB-UE-X2AP-ID:774994 UI | 8. |
| 16:44:38.651 | 22948623 | 126754935 | ENB <-- TENB | X2AP | SgNBReleaseRequestAcknowledge | SgNB-UE-X2AP-ID:774994 UE-X2AP-ID:2530 | |
| | | | | | | targetPhysCellId:488 logicalChannelIdentity:3 logicalChannelIdentity:4 eps-BearerIdentity:6 eps-BearerIdentity:7 logicalChannelGroup: | |
| 16:44:38.655 | 22948623 | 126754935 | ENB --> UE | RRC | RRCConnectionReconfiguration | :eventA3 a3Offset:7 trigQnt:rsrp :eventA2 trigQnt:rsrp thresholdRsrp:23 :eventA3 a3Offset:7 trigQnt:rsrp measId:1(A3) measId:2(A2 | |
| | | | | | | BW:10.0MHz ttiBundling:FALSE txMode:4(CL-MIMO) | |
| 16:44:38.655 | 22948623 | 126754935 | ENB <-- TENB | X2AP | SNStatusTransfer | e-RAB-ID:7 SgNB-UE-X2AP-ID:774994 UE-X2AP-ID:2530 UE-X2AP-ID:2530 | |

TO FIG. 7D

FROM FIG. 7C

| | | | | | | | FIG. 6's STEPS |
|---|---|---|---|---|---|---|---|
| 16:44:38.713 | 22948623 | 126754935 | ENB <-- UE | RRC | RRCConnectionReconfigurationComplete | | |
| 16:44:38.714 | 22948623 | 126754935 | ENB --> CN | S1AP | E-RABModificationIndication | ipAddr:10.79.74.26 idAddr:10.79.74.26 mmeUeS1apId:54179097 enbUeS1apId:271785 e-RAB-ID:7 e-RAB-ID:6 | 8. |
| 16:44:38.723 | 22948623 | 126754935 | ENB <-- CN | S1AP | E-RABModificationConfirm | mmeUeS1apId:54179097 enbUeS1apId:271785 e-RAB-ID:7 | |
| 16:44:38.723 | 22948623 | 126754935 | ENB --> TENB | X2AP | UEContextRelease | SgNB-UE-X2AP-ID:774994 UE-X2AP-ID:0 UE-X2AP-ID:2530 | |
| 16:44:38.883 | 22948623 | 126754935 | ENB <-- UE | RRC | MeasurementReport | measID:5(B1) PCell:{rsrp:-89,rsrq:-9.0} phCellId:121 phCellId:122 NeighCells:{rsrp:104,rsrp:-109,rsrq:-13.5,rsrq:-16.0} | 1. |
| 16:44:38.965 | 22948623 | 126754935 | ENB --> TENB | X2AP | SgNBAdditionRequest | ipAddr:10.79.74.26 ipAddr:10.164.27.94 plmnIdentity:208-01 enbId:89643 cellId:15 e RAB-ID:7 gTP-TEID:C3843B6D'H gTP-TEID:80204 | 2. |

FIG. 7D
(PRIOR ART)

FIG. 7E
(PRIOR ART)

| time | cell | ueRef | direction | type | message | parameters | FIG. 6's STEPS |
|---|---|---|---|---|---|---|---|
| 16:44:38.965 | 22948623 | 126754935 | ENB --> TENB | NR_RRC | CG-ConfigInfo | physCellId:121 ssbFrequency:647040 | |
| 16:44:38.965 | 22948623 | 126754935 | ENB --> TENB | NR_RRC | UE-NR-Capability | | |
| 16:44:38.965 | 22948623 | 126754935 | ENB --> TENB | NR_RRC | UE-MRDC-Capability | | |
| 16:44:38.979 | 22948623 | 126754935 | ENB <-- TENB | X2AP | SgNBAdditionRequestAcknowledge | ipAddr:10.79.68.7 ipAddr:10.79.68.7 ipAddr:10.79.68.7 e-RABH-ID:7 gTP-TEID:930C454B'H gTP-TEID:6A1F21A3'H gTP-TEID:231C49D9'H | 3. |
| 16:44:38.979 | 22948623 | 126754935 | ENB <-- TENB | NR_RRC | CG-Config | logicalChannelIdentity:1 drb_identity:4 logicalChannelGroup:5 physCellId:121 ssbFrequency:647040 | |
| 16:44:38.984 | 22948623 | 126754935 | ENB --> TENB | X2AP | SNStatusTransfer | e-RAB-ID:7 SgNB-UE-X2AP-ID:774995 UE-X2AP-ID:2531 UE-X2AP-ID:0 | 3. |

TO FIG. 7F

FIG. 7F
(PRIOR ART)

FROM FIG. 7E

| | | | | | | | FIG. 6's STEPS |
|---|---|---|---|---|---|---|---|
| 16:44:38.985 | 22948623 | 126754935 | ENB --> UE | RRC | RRCConnectionReconfiguration | targetPhysCellId:488 logicalChannelIdentity:3 logicalChannelIdentity:4 eps-BearerIdentity:6 eps-BearerIdentity:7 logicalChannelGroup: :eventA2 trigQnt:rsrp thresholdRsrp:23 :eventA3 a3Offset:7 trigQnt:rsrp measId:1(A3) measId:2(A2) measId:3(A3) ra-PreambleIndex: MIMO) | 4. |
| 16:44:38.985 | 22948623 | 126754935 | ENB --> UE | NR_RRC | RRCReconfiguration | logicalChannelIdentity:1 drb_identity:4 logical ChannelGroup:5 physCellId:121 ssbFrequency:647040 | |
| 16:44:38.985 | 22948623 | 126754935 | ENB --> UE | NR_RRC | RadioBearerConfig | | |
| 16:44:39.061 | 22948623 | 126754935 | ENB <-- UE | RRC | RRCConnectionReconfigurationComplete | | 5. |
| 16:44:39.061 | 22948623 | 126754935 | ENB <-- UE | NR_RRC | RRCReconfigurationComplete | | |
| 16:44:39.062 | 22948623 | 126754935 | ENB --> TENB | X2AP | SgNBReconfigurationComplete | sgNB-UE-X2AP-ID:774995 UE-X2AP-ID:2531 | 6. |
| 16:44:39.062 | 22948623 | 126754935 | ENB --> TENB | NR_RRC | RRCReconfigurationComplete | | |

TO FIG. 7G

FIG. 7G
(PRIOR ART)

FROM FIG. 7F

| | | | | | | | FIG. 6's STEPS |
|---|---|---|---|---|---|---|---|
| 16:44:39.062 | 22948623 | 126754935 | ENB --> CN | S1AP | E-RABModificationIndication | ipAddr:10.79.68.7 ipAddr:10.79.74.26 mmeUeS1apId:54179097 enbEuS1apId:271785 e-RAB-ID:7 e-RAB-ID:6 | |
| 16:44:39.070 | 22948623 | 126754935 | ENB <-- CN | S1AP | E-RABModificationConfirm | mmeUeS1apId:54179097 enbUeS1apId:271785 e-RAB-ID:7 | |
| 16:44:40.034 | 22948623 | 126754935 | ENB <-- UE | RRC | RRC_SCG_FAILURE_ INFORMATION_NR | LTEEvent:,esId271785,msid:54179097 | 7. |
| 16:44:40.038 | 22948623 | 126754935 | ENB --> TENB | X2AP | SgNBReleaseRequest | ipAddr:10.79.74.26 e-RAB-ID:7 gtp-TEID:B00CC542'H cause:radioNetwork:radio-connection-with-UE-lost SgNB-UE-X2AP-ID:774994 UI | 8. |
| 16:44:40.041 | 22948623 | 126754935 | ENB <-- TENB | X2AP | SgNBReleaseRequestAcknowledge | SgNB-UE-X2AP-ID:774995 UE-X2AP-ID:2531 | |
| | | | | | | targetPhysCellId:488 logicalChannelIdentity:3 logicalChannelIdentity:4 eps-BearerIdentity:6 eps-BearerIdentity:7 logicalChannelGroup: | |
| 16:44:40.044 | 22948623 | 126754935 | ENB --> UE | RRC | RRCConnectionReconfiguration | :eventA3 a3Offset:7 trigQnt:rsrp :eventA2 trigQnt:rsrp thresholdRsrp:23 :eventA3 a3Offset:7 trigQnt:rsrp measId:1(A3) measId:2(A2) | |

TO FIG. 7H

FROM FIG. 7G

| | | | | | | | FIG. 6's STEPS |
|---|---|---|---|---|---|---|---|
| | | | | | | BW:10.0MHz ttiBundling:FALSE txMode:4(CL-MIMO) | |
| 16:44:40.045 | 22948623 | 126754935 | ENB <-- TENB | X2AP | SNStatusTransfer | e-RAB-ID:7 SgNB-UE-X2AP-ID:774995 UE-X2AP-ID:2531 UE-X2AP-ID:2531 | 8. |
| 16:44:40.111 | 22948623 | 126754935 | ENB <-- UE | RRC | RRCConnectionReconfigurationComplete | | 8. |
| 16:44:40.112 | 22948623 | 126754935 | ENB --> CN | S1AP | E-RABModificationIndication | ipAddr:10.79.74.26 idAddr:10.79.74.26 mmeUeS1apId:54179097 enbUeS1apId:271785 e-RAB-ID:7 e-RAB-ID:6 | 8. |
| 16:44:40.120 | 22948623 | 126754935 | ENB <-- CN | S1AP | E-RABModificationConfirm | mmeUeS1apId:54179097 enbUeS1apId:271785 e-RAB-ID:7 | 8. |
| 16:44:40.120 | 22948623 | 126754935 | ENB --> TENB | X2AP | UEContextRelease | SgNB-UE-X2AP-ID:774995 UE-X2AP-ID:0 UE-X2AP-ID:2531 | 8. |
| 16:44:40.284 | 22948623 | 126754935 | ENB <-- UE | RRC | MeasurementReport | measID:6(B1) PCell:{rsrp:-89,rsrq:-9.0} phCellId:121 phCellId:122 NeighCells:{rsrp:104,rsrp:-109,rsrq:-13.5,rsrq:-16.5} | 1. |
| 16:44:40.351 | 22948623 | 126754935 | ENB --> TENB | X2AP | SgNBAdditionRequest | ipAddr:10.79.74.26 ipAddr:10.164.27.94 plmnIdentity:208-01 enbId:89643 cellId:15 e-RAB-ID:7 gTP-TEID:03FC764F'H gTP-TEID:80204 | 2. |

FIG. 7H
(PRIOR ART)

FIG. 7I
(PRIOR ART)

| time | cell | ueRef | direction | type | message | parameters | FIG. 6's STEPS |
|---|---|---|---|---|---|---|---|
| 16:44:40.351 | 22948623 | 126754935 | ENB --> TENB | NR_RRC | CG-ConfigInfo | physCellId:121 ssbFrequency:647040 | |
| 16:44:40.351 | 22948623 | 126754935 | ENB --> TENB | NR_RRC | UE-NR-Capability | | |
| 16:44:40.351 | 22948623 | 126754935 | ENB --> TENB | NR_RRC | UE-MRDC-Capability | | |
| 16:44:40.365 | 22948623 | 126754935 | ENB <-- TENB | X2AP | SgNBAdditionRequestAcknowledge | ipAddr:10.79.68.7 ipAddr:10.79.68.7 ipAddr:10.79.68.7 e-RAB-ID:7 gTP-TEID:B6612191'H gTP-TEID:03B2CBF5'H gTP-TEID:E98DBC62'H | 3. |
| 16:44:40.365 | 22948623 | 126754935 | ENB <-- TENB | NR_RRC | CG-Config | logicalChannelIdentity:1 drb_identity:4 logicalChannelGroup:5 physCellId:121 ssbFrequency:647040 | |
| 16:44:40.370 | 22948623 | 126754935 | ENB --> TENB | X2AP | SNStatusTransfer | e-RAB-ID:7 SgNB-UE-X2AP-ID:774996 UE-X2AP-ID:2532 UE-X2AP-ID:0 | 3. |

TO FIG. 7J

FIG. 7J
(PRIOR ART)

FROM FIG. 7I

| | | | | | | | FIG. 6's STEPS |
|---|---|---|---|---|---|---|---|
| 16:44:40.371 | 22948623 | 126754935 | ENB --> UE | NR_RRC | RRCConnectionReconfiguration | targetPhysCellId:488 logicalChannelIdentity:3 logicalChannelIdentity:4 eps-BearerIdentity:6 eps-BearerIdentity:7 logicalChannelGroup: :eventA2 trigQnt:rsrp thresholdRsrp:23 :eventA3 a3Offset:7 trigQnt:rsrp measId:1(A3) measId:2(A2) measId:3(A3) ra-PreambleIndex: MIMO) | 4. |
| 16:44:40.371 | 22948623 | 126754935 | ENB --> UE | NR_RRC | RRCReconfiguration | logicalChannelIdentity:1 drb_identity:4 logical ChannelGroup:5 physCellId:121 ssbFrequency:647040 | |
| 16:44:40.371 | 22948623 | 126754935 | ENB --> UE | NR_RRC | RadioBearerConfig | | |
| 16:44:40.459 | 22948623 | 126754935 | ENB <-- UE | RRC | RRCConnectionReconfigurationComplete | | 5. |
| 16:44:40.459 | 22948623 | 126754935 | ENB <-- UE | NR_RRC | RRCReconfigurationComplete | | |
| 16:44:40.460 | 22948623 | 126754935 | ENB --> TENB | X2AP | SgNBReconfigurationComplete | sgNB-UE-X2AP-ID:774996 UE-X2AP-ID:2532 | 6. |
| 16:44:40.460 | 22948623 | 126754935 | ENB --> TENB | NR_RRC | RRCReconfigurationComplete | | |
| 16:44:42.460 | 22948623 | 126754935 | ENB --> CN | S1AP | E-RABModificationIndication | ipAddr:10.79.68.7 ipAddr:10.79.74.26 mmeUeS1apId:54179097 enbEuS1apId:271785 e-RAB-ID:7 e-RAB-ID:6 | |

TO FIG. 7K

FIG. 7K
(PRIOR ART)

FROM FIG. 7J

| | | | | | | | FIG. 6's STEPS |
|---|---|---|---|---|---|---|---|
| 16:44:42.468 | 22948623 | 126754935 | ENB <-- CN | S1AP | E-RABModificationConfirm | mmeUeS1apId:54179097 enbUeS1apId:271785 e-RAB-ID:7 | |
| 16:44:42.089 | 22948623 | 126754935 | ENB <-- UE | RRC | RRC_SCG_FAILURE_ INFORMATION_NR | LTEEvent:,esId271785,msid:54179097 | 7. |
| 16:44:42.093 | 22948623 | 126754935 | ENB --> TENB | X2AP | SgNBReleaseRequest | ipAddr:10.79.74.26 e-RAB-ID:7 gtp-714F6B2A'H cause:radioNetwork:radio-connection-with-UE-lost SgNB-UE-X2AP-ID:774996 UI | 8. |
| 16:44:42.096 | 22948623 | 126754935 | ENB <-- TENB | X2AP | SgNBReleaseRequestAcknowledge | SgNB-UE-X2AP-ID:774996 UE-X2AP-ID:2532 | 8. |
| | | | | | | targetPhysCellId:488 logicalChannelIdentity:3 logicalChannelIdentity:4 eps-BearerIdentity:6 eps-BearerIdentity:7 logicalChannelGroup: | 8. |
| 16:44:42.100 | 22948623 | 126754935 | ENB --> UE | RRC | RRCConnectionReconfiguration | :eventA3 a3Offset:7 trigQnt:rsrp :eventA2 trigQnt:rsrp thresholdRsrp:23 :eventA3 a3Offset:7 trigQnt:rsrp measId:1(A3) measId:2(A2) | 8. |
| | | | | | | BW:10.0MHz ttiBundling:FALSE txMode:4(CL-MIMO) | 8. |
| 16:44:42.100 | 22948623 | 126754935 | ENB <-- TEN | BX2AP | SNStatusTransfer | e-RAB-ID:7 SgNB-UE-X2AP-ID:774996 UE-X2AP-ID:2532 UE-X2AP-ID:2532 | 8. |

TO FIG. 7L

FROM FIG. 7K

| | | | | | | | FIG. 6's STEPS |
|---|---|---|---|---|---|---|---|
| 16:44:42.171 | 22948623 | 126754935 | ENB <-- UE | RRC | RRCConnectionReconfigurationComplete | | |
| 16:44:42.172 | 22948623 | 126754935 | ENB --> CN | S1AP | E-RABModificationIndication | ipAddr:10.79.74.26 idAddr:10.79.74.26 mmeUeS1apId:54179097 enbUeS1apId:271785 e-RAB-ID:7 e-RAB-ID:6 | 8. |
| 16:44:42.180 | 22948623 | 126754935 | ENB <-- CN | S1AP | E-RABModificationConfirm | mmeUeS1apId:54179097 enbUeS1apId:271785 e-RAB-ID:7 | 8. |
| 16:44:42.180 | 22948623 | 126754935 | ENB --> TENB | X2AP | UEContextRelease | SgNB-UE-X2AP-ID:774996 UE-X2AP-ID:0 UE-X2AP-ID:2532 | 8. |
| 16:44:42.344 | 22948623 | 126754935 | ENB <-- UE | RRC | MeasurementReport | measID:7(B1) PCell:{rsrp:-88,rsrq:-9.0} phCellId:121 phCellId:122 phCellId:185 NeighCells:{rsrp:-104,rsrp:-107,rsrq:-14.0,rsrq: | 1. |
| 16:44:42.407 | 22948623 | 126754935 | ENB --> TENB | X2AP | SgNBAdditionRequest | ipAddr:10.79.74.26 ipAddr:10.164.27.94 plmnIdentity:208-01 enbId:89643 cellId:15 e-RAB-ID:7 gTP-TEID:38BE7BB3'H gTP-TEID:80204 | 2. |

FIG. 7L
(PRIOR ART)

HANDLING OF CONTINUOUS SECONDARY gNB ADDITION FAILURE REQUESTS AND SECONDARY CELL GROUP FAILURES FROM A SAME 5G NEW RADIO CELL

PRIORITY CLAIM

This application is a national stage of International Application No. PCT/IN2021/050695, filed Jul. 19, 2021, the disclosure of which is hereby incorporated by reference in its entirety for all purposes.

TECHNICAL FIELD

The present disclosure relates to a 4G network node (and a method implemented thereby) and a terminal node (and a method implemented thereby), all of which are configured to improve the probability of a Secondary Cell Group (SCG) bearer setup by allowing the setup request to be sent to an alternative candidate SgNB/NR (Secondary gNB/5G New Radio or Radio Access for 5G) cell, in case it exists, instead of repeatedly persisting with the initial candidate SgNB/NR cell after experiencing a predetermined number of SgNB addition request rejections or SCG failures.

BACKGROUND

The present disclosure is related to 5G New Radio (NR) technology and, in particular, to the NR Non-Standalone (NSA) case where an E-UTRA-NR Dual Connectivity (EN-DC) capable UE has simultaneous connectivity to eNB (4G LTE) and gNB (5G). When the EN-DC capable UE has simultaneous connectivity to eNB and gNB then all EN-DC related control signalling happens via an LTE master node (MN), and user plane signalling can happen via both LTE and NR depending upon certain procedures. However, during an EN-DC call setup, problematic SgNB addition rejections and SCG failures can happen from the same NR cell. A detailed description is provided next to explain these problematic SgNB addition rejections and SCG failures.

NR NSA Leg Setup Signalling Flow:

FIG. 1 (PRIOR ART) is a NR NSA signalling flow diagram 100 illustrating a NR leg setup procedure, which is also described in 3rd Generation Partnership Project (3GPP) Technical Specification (TS) 37.340 V15.9.0 (2020-07) (the contents of which are hereby incorporated by reference herein). The NR NSA signalling flow diagram 100 is well known to those skilled in the art and illustrates the following components: User Equipment (UE) 102, Master eNodeB (MeNB) 104, SgNB 106, Serving Gateway (SGW) 108, and Mobility Management Entity (MME) 110. Prior to the NR leg setup procedure, the UE 102 has Uplink (UL)/Downlink (DL) user data in LTE established with the MeNB 104 and SGW 108. The steps of the NR leg setup procedure are discussed next:

1. UE 102 sends a NR B1 Measurement Report to MeNB 104. The NR B1 Measurement Report contains NR cells satisfying a particular B1 threshold where this B1 threshold was previously sent by the MeNB 104 to UE 102 during the configuration of B1 measurement. Upon receipt of the NR B1 Measurement Report, the MeNB 104 prepares for Data Radio Bearer (DRB) reconfiguration and chooses a NR cell having the best RSRP (Reference Symbol Received Power or Reference Signal Received Power) to establish a SCG bearer.
2. MeNB 104 sends a SgNB Addition Request message to the selected SgNB 106. The SgNB Addition Request message carries the Radio Resource Control (RRC), Radio Bearer configuration, UE capabilities, and security information. Upon receipt of the SgNB Addition Request message, the SgNB 106 allocates Packet Data Convergence Protocol (PDCP) and SCG resources.
3. SgNB 106 sends a SgNB Addition Request Acknowledge to the MeNB 104. The SgNB Addition Request Acknowledge includes a NR RRC configuration message and information about the radio resources and bearers admitted with the 5G network. Upon receipt of the SgNB Addition Request Acknowledge, the MeNB 104 suspends DRB, sends a Secondary Node (SN) status Transfer message to SgNB 106 (which prepares for UL data), and sends the NR RRC Connection Reconfiguration message to the UE 102.
4. UE 102 receives the NR RRC Connection Reconfiguration message from the MeNB 104. Upon receipt of the NR RRC Connection Reconfiguration message, the UE 102 is assigned 5G radio resources after the UE 102 extracts the 5G NR RACH information parameters and Cell Radio Network Temporary Identifier (C-RNTI) for 5G access. The UE 102 completes LTE random access with MeNB 104. In addition, the UE 102 transmits UL User Data in LTE to the SgNB 106 and SGW 108.
5. UE 102 sends a RRC Reconfiguration Complete message to the MeNB 104. The RRC Reconfiguration Complete message indicates that the UE 102 received the NR RRC Connection Reconfiguration message. The RRC Reconfiguration Complete message carries the “NR RRC Reconfiguration Complete” message which the MeNB 104 transmits to the SgNB 106.
6. The MeNB 104 informs the SgNB 106 about the NR RRC Reconfiguration Complete message. The “NR RRC Reconfiguration Complete” message is delivered by the MeNB 104 to the SgNB 106 via the “MeNB to SgNB” container.
7. The UE 104 initiates the random-access (RA) procedure with the SgNB 106. The UE 102 initiates the random-access procedure by sending RACH preambles to the SgNB 106. The secondary node SgNB 106 responds with an RA Response to the UE 102. The RA Response message also carries an uplink grant for Msg3 transmission. The NR PDCCCH channel provides information about resources allocated for RA response.
8. MeNB 104 sends a S1ΔP-E-RAB modification indication message to the MME 110 indicating that the data bearer is being switched from 4G-LTE to 5G NR. Upon receipt of the S1AP-E-RAB modification indication message, the MME 110 updates the bearer at the SGW 108.
9. SGW 108 switches the data path from the MeNB 104 to SgNB 106 and responds back to the MME 110. The MME 110 responds back by sending a S1AP E-RAB modification confirmation message. Data is now being sent directly to the SgNB 106.

SgNB Addition Request Reject Reasons:

FIG. 2 (PRIOR ART) is a signalling flow diagram 200 illustrating a SgNB addition request rejection which is also described in 3GPP TS 36.423 V15.10.0 (2020-07) (the contents of which are hereby incorporated by reference herein). The steps of the SgNB addition request rejection procedure are discussed next:

1. UE 102 sends a NR B1 Measurement Report to MeNB 104 (FIG. 2’s step 1 is same as FIG. 1’s step 1).

2. MeNB 104 sends a SgNB Addition Request message to the SgNB 106 (FIG. 2's step 2 is same as FIG. 1's step 2).
3. Upon receiving the SgNB Addition Request message, if the SgNB 106 is not able to accept any of the bearers or a failure occurs during the SgNB Addition Preparation, then the SgNB 106 sends a SgNBAdditionRequestReject message with an appropriate cause value to the MeNB 104 (FIG. 2's step 3 is not same as FIG. 1's process where the SgNB 106 was able to accept the bearers and a failure did not occur during the SgNB Addition Preparation).

Possible Reasons for the SgNB Addition Rejection can be as Follows:

1. If SgNB 106 receives SgNB Addition Request message containing multiple E-RAB ID Information Elements (IEs) (in the E-RABs To Be Added List IE) set to the same value.
2. If SgNB 106 receives SgNB Addition Request message containing an E-RAB Level Quality of Service (QoS) Parameters IE which contains a QoS Class Indicator (QCI) IE indicating a Guaranteed Bit Rate (GBR) bearer and which does not contain the GBR QoS Information IE.
3. If the supported algorithms for the encryption defined in the Encryption Algorithms IE in the UE Security Capabilities IE of the SgNB Addition Request message, plus the mandated support of Evolved Packet System (EPS) Encryption Algorithm (EEA) 0 in all UEs, do not match any algorithms defined in the configured list of allowed encryption algorithms in the SgNB 106.
4. If SgNB 106 receives SgNB Addition Request message which does not contain the Closed Subscriber Group (CSG) Membership Status IE, and the Secondary Cell (SCell) served by the SgNB 106 is a hybrid cell.
5. If SgNB 106 receives SgNB Addition Request message containing a SgNB UE X2AP ID IE that does not match any existing UE Context that has such ID.
6. If SgNB 106 receives SgNB Addition Request message containing both the Correlation ID and the Selected IP Traffic Offload SIPTO) Correlation ID IEs for the same E-RAB.

There may be some other reasons for SgNB addition request rejection which are not mentioned here.

SCG Failure:

FIG. 3 (PRIOR ART) is a signalling flow diagram 300 used to explain a SCG failure indication. Note: the signalling flow diagram 300 indicates various signalling per 3GPP TS 38.331 V15.10.0 (2020-07) (the contents of which are hereby incorporated by reference herein) where the bold text is associated with the SCG failure indication. The purpose of the SCG failure indication procedure is to inform the EUTRAN or NR MN about a SCG failure that the UE 102 has experienced. SCG failures can be any of the following (for example): SCG radio link failure, failure of SCG reconfiguration with sync, SCG configuration failure for RRC message on SRB3, SCG integrity check failure and exceeding the maximum uplink transmission timing difference. The UE 102 includes measurement results available according to current measurement configuration of both the MN and the SN in the SCG Failure Information message 302 sent to the MeNB 104 (MN). The MeNB 104 (MN) handles the SCG Failure Information message 302 and may decide to keep, change, or release the SN/SCG. Further, the MeNB 104 (MN) may forward the measurement results and the SCG failure type to the SgNB 106 (SN).

The UE 102 initiates the procedure to report SCG failures when the SCG transmission is not suspended and when one of the following failure causes:

a) t310-Expiry
b) scg-ChangeFailure
C) randomAccessProblem
d) rlc-MaxNumRetx
e) srb3-IntegrityFailure
f) scg-reconfigFailure Event B1 Information:

Event B1 information is included in the B1 measurement report sent from UE 102 to MeNB 104 as discussed in FIG. 1's step 1 and FIG. 2's step 1. As per 3GPP TS 36.331 V16.0.0 (March 2020) (the contents of which are hereby incorporated by reference herein), the Event B1 is defined by following equations:

Event B1: Inter Radio Access Technology (RAT) Neighbor Becomes Better than Threshold Inequality B1-1 (Entering Condition):

$$Mn+Ofn-Hys>\text{Thresh}$$

Inequality B1-2 (Leaving Condition):

$$Mn+Ofn+Hys<\text{Thresh}$$

The variables in the formula are defined as follows:

Mn is the measurement result of the inter-RAT neighbor cell, not taking into account any offsets.

Ofn is the frequency specific offset of the frequency of the inter-RAT neighbor cell (i.e., offsetFreq as defined within the measObject corresponding to the frequency of the neighbor inter-RAT cell).

Hys is the hysteresis parameter for this event (i.e., hysteresis as defined within reportConfigInterRAT for this event).

Thresh is the threshold parameter for this event. Thresh is expressed in the same unit as Mn.

Mn is expressed in dBm or in dB, depending on the measurement quantity of the inter-RAT neighbor cell.

Ofn and Hys are expressed in dB.

Problems with Existing Solutions

In the existing mechanism of SgNB addition, the following problematic scenarios are observed in some network deployments:

1. MeNB 104 receives consecutive SgNB Addition Request Rejections from same NR cell whenever SgNB addition request is sent by MeNB 104 to this NR cell. This keeps on repeating until UE 102 moves to another LTE anchor cell and adds a different SgNB 106. See FIG. 2's step 3 and FIGS. 4-5.
2. MeNB 104 receives consecutive RRC SCG failure indication messages 302 (see FIG. 3) from UE 102 for same NR cell and same NR cell is being added again after X2AP connection is released by MeNB 104. This keeps on repeating until UE 102 moves to a different LTE anchor cell and adds another SgNB 106. See FIGS. 3 and 6-7.

FIGS. 4 and 5A-5C (PRIOR ART) respectively illustrate a signalling flow diagram 400 and a call flow diagram 500 which are used to describe in more detail the problematic scenario 1 associated with the SgNB addition request rejections (see also FIGS. 1 and 2). Note: the call flow diagram 500 which has typical parameter configurations is from a live network and contains 3GPP standard messages. The steps of the signalling flow diagram 400 and the call flow diagram 500 are discussed next:

1. UE 102 sends B1 measurement report for two NR cells with Physical-layer Cell Identity (PCI) 9 and 10 to MeNB 104. These 2 NR cells are probable candidates for SgNB addition as RSRP level for these NR cells is above b1 threshold which is set to −109 dBm in the network which has been taken as a reference.
2. MeNB 104 sends SgNB addition request to SgNB 106 NR cell with PCI 10 as it is having best RSRP.
3. MeNB 104 receives SgNB addition request reject message with unspecified reason from SgNB 106 NR cell with PCI 10.

1-3 (repeat). UE 102 sends B1 measurement report again for same NR cells with PCI 9 and 10 to MeNB 104. MeNB 104 again sends SgNB addition request to same best SgNB 106 NR cell with PCI 10 and receives rejection message with unspecified reason from SgNB 106 NR call. Thereafter, subsequent B1 measurement reports are sent to MeNB 104 and SgNB addition requests are sent to the same SgNB 106 NR cell with PCI 10 resulting in failure due to SgNB addition rejects and this process repeats until the UE 102 performs a handover to a different LTE anchor cell and subsequently reports a different gNB (NR cell) in B1 measurement report which gets added successfully as SgNB 106.

Currently there is no limit on count of SgNB addition requests that can be made to same NR cell from which multiple rejections messages have already been received by anchor LTE cell. Thus, in this scenario the EN-DC capable UE 102 measures the NR cell continuously as long as successful addition does not happen, and these measurement gaps could adversely impact the user experience in terms of user throughput, latency, and UE battery life.

FIGS. 6 and 7A-7L (PRIOR ART) respectively illustrate a signalling flow diagram 600 and a call flow diagram 700 which are used to describe in more detail the problematic scenario 2 associated with the SCG failures (see also FIG. 3). Note: the call flow diagram 700 which has typical parameter configurations is from a live network and contains 3GPP standard messages. The steps of the signalling flow diagram 600 and the call flow diagram 700 are discussed next:

1. UE 102 sends B1 measurement report for two NR cells with PCI 121 and 122 to MeNB 104. These 2 NR cells are probable candidates for SgNB addition as the RSRP levels for these NR cells are above blthreshold which is set to −124 dBm in the network which has been taken as a reference.
2. MeNB 104 sends SgNB addition request to SgNB 106 associated with NR cell having PCI 121 as it has the best RSRP.
3. MeNB 104 receives SgNB addition request acknowledge message from SgNB 106 (NR cell with PCI 121). MeNB 104 then sends SN status transfer to SgNB 106 (NR cell with PCI 121).
4. MeNB 104 sends RRC Connection Reconfiguration message to the UE 102.
5. UE 102 sends RRC reconfiguration complete message to MeNB 104.
6. MeNB 104 sends SgNB reconfiguration complete message to SgNB 106 (NR cell with PCI 121). The SgNB addition procedure is completed.
7. UE 102 sends RRC SCG failure indication message 302 to MeNB 104. This SCG failure under consideration happens for NR cell with PCI 121.
8. After SCG failure, the MeNB 104 sends SgNB release request message to SgNB 106 (NR cell with PCI 121) with causes the loss of the radio connection with UE 102. The SgNB release request message is acknowledged by SgNB 106 (NR cell with PCI 121) by sending SgNB release request acknowledge message to MeNB 104. Eventually after bearer modification (see RRC Connection Reconfiguration message, RRC Connection Reconfiguration Complete message, and SN Status Transfer message), MeNB 104 sends UE context release message to SgNB 106 to release the NR leg.

1-8 (repeats) Thereafter, UE 102 sends B1 measurement report to MeNB 104 for SgNB 106 (NR cell with PCI 121) and SgNB addition procedure is successfully completed for same best NR cell with PCI 121. Then again, the RRC SCG failure information is sent by UE 102 to MeNB 104 indicating SCG failure on NR cell with PCI 121.

9. This procedure including steps 1-8 keeps repeating until the UE 102 performs a handover to another LTE anchor cell and subsequently reports a different SgNB in the B1 measurement report which gets added successfully as SgNB and no SCG failure is reported by UE 102 on this NR SgNB.

Currently there is no provision to restrict SgNB addition for a given NR cell based on count of SCG failures that is reported by UE 102 for the same NR cell. Thus, in this scenario the NR cell with PCU 121 is added repeatedly via SgNB addition procedure because the UE 102 reports the same NR cell with PCT 121 as the best candidate in B1 measurement reports. This leads to a large number of NR drops thereby adversely impacting retainability Key Performance Indicators (KPIs), user throughput, and UE battery life.

Further, the aforementioned problematic scenarios 1 and 2 also adversely impact at least the following: (1) KPI EN-DC setup success rate on both the 4G and 5G sides, (2) NSA NR retainability, and (3) user experience in terms of throughput, latency, and UE battery life as an EN-DC capable UE 102 has to measure the NR cell repeatedly until the SgNB addition procedure is successful or until there is no RRC SCG failure information message sent by UE 102 to MeNB 104. In view of the foregoing, there is a need for an efficient solution to address these problematic scenarios involving continuous SgNB addition rejections and/or continuous SCG failures. This need and other needs are addressed by the present disclosure.

SUMMARY

A 4G network node (e.g., MeNB), a terminal node (e.g., UE) and various methods for addressing the aforementioned need in the prior art are described in the independent claims. Advantageous embodiments of the 4G network node, the terminal node, and the various methods are further described in the dependent claims.

In one aspect, the present disclosure provides a 4G network node (e.g., MeNB) configured to interact with a terminal node (e.g., UE) and a 5G network node (e.g., SgNB). The 4G network node comprises a processor and a memory that stores processor-executable instructions, wherein the processor interfaces with the memory to execute the processor-executable instructions whereby the 4G network node is operable to perform a first receive operation, a second receive operation, and a transmit operation. In the first receive operation, the 4G network node receives, from the terminal node, a B1 measurement report which references a 5G NR cell. In the second receive operation, the 4G network node receives at least one of the following: (1) a predetermined number of consecutive SgNB addition request rejections associated with the 5G NR cell; or (2) a predetermined number of consecutive SCG failures associated with the 5G NR cell. In the transmit operation, the 4G network node upon receiving the predetermined number of consecutive SgNB addition request rejections associated with the 5G NR cell or the predetermined number of consecutive SCG failures associated with the 5G NR cell then transmits to the terminal node a RRC reconfiguration message having at least two parameters: (1) an offset value to be associated with the 5G NR cell, and (2) a timer value indicating a period of time where the terminal node will not reference the 5G NR cell in a new B1 measurement report. An advantage associated with this specially configured 4G network node is that by performing the aforementioned operations there is an improvement in the probability of a SCG bearer setup by allowing a setup request to be sent to an alternative candidate SgNB/NR cell, in case it exists, instead of repeatedly persisting with the initial candidate SgNB/NR cell after experiencing a predetermined number of SgNB addition request rejections or SCG failures.

In another aspect, the present disclosure provides a method implemented by a 4G network node (e.g., MeNB) configured to interact with a terminal node (e.g., UE) and a 5G network node (e.g., SgNB). The method comprising a first receiving step, a second receiving step, and a transmitting step. In the first receiving step, the 4G network node receives, from the terminal node, a B1 measurement report which references a 5G NR cell. In the second receiving step, the 4G network node receives at least one of the following: (1) a predetermined number of consecutive SgNB addition request rejections associated with the 5G NR cell; or (2) a predetermined number of consecutive SCG failures associated with the 5G NR cell. In the transmitting step, the 4G network node upon receiving the predetermined number of consecutive SgNB addition request rejections associated with the 5G NR cell or the predetermined number of consecutive SCG failures associated with the 5G NR cell then transmits to the terminal node a RRC reconfiguration message having at least two parameters: (1) an offset value to be associated with the 5G NR cell, and (2) a timer value indicating a period of time where the terminal node will not reference the 5G NR cell in a new B1 measurement report. An advantage associated with this method is that by the 4G network node performing the aforementioned steps there is an improvement in the probability of a SCG bearer setup by allowing a setup request to be sent to an alternative candidate SgNB/NR cell, in case it exists, instead of repeatedly persisting with the initial candidate SgNB/NR cell after experiencing a predetermined number of SgNB addition request rejections or SCG failures.

In yet another aspect, the present disclosure provides a terminal node (e.g., UE) configured to interact with a 4G network node (e.g., MeNB). The terminal node comprises a processor and a memory that stores processor-executable instructions, wherein the processor interfaces with the memory to execute the processor-executable instructions whereby the terminal node is operable to perform a transmit operation and a receive operation. In the transmit operation, the terminal node transmits, to the 4G network node, a B1 measurement report which references a 5G NR cell. In the receive operation, the terminal node receives, from the 4G network node, a RRC reconfiguration message having at least two parameters: (1) an offset value associated with the 5G NR cell that has been associated with a predetermined number of consecutive SgNB addition request rejections or a predetermined number of consecutive SCG failures; and (2) a timer value indicating a period of time where the terminal node will not reference the 5G NR cell in a new B1 measurement report. An advantage associated with this specially configured terminal node is that by performing the aforementioned operations there is an improvement in the probability of a SCG bearer setup by allowing a setup request to be sent to an alternative candidate SgNB/NR cell, in case it exists, instead of repeatedly persisting with the initial candidate SgNB/NR cell after experiencing a predetermined number of SgNB addition request rejections or SCG failures.

In yet another aspect, the present disclosure provides a method implemented by a terminal node (e.g., UE) configured to interact with a 4G network node (e.g., MeNB). The method comprises a transmitting step and receiving step. In the transmitting step, the terminal node transmits, to the 4G network node, a B1 measurement report which references a 5G NR cell. In the receiving step, the terminal node receives, from the 4G network node, a RRC reconfiguration message having at least two parameters: (1) an offset value associated with the 5G NR cell that has been associated with a predetermined number of consecutive SgNB addition request rejections or a predetermined number of consecutive SCG failures; and (2) a timer value indicating a period of time where the terminal node will not reference the 5G NR cell in a new B1 measurement report. An advantage associated with this method is that by the terminal node performing the aforementioned steps there is an improvement in the probability of a SCG bearer setup by allowing a setup request to be sent to an alternative candidate SgNB/NR cell, in case it exists, instead of repeatedly persisting with the initial candidate SgNB/NR cell after experiencing a predetermined number of SgNB addition request rejections or SCG failures.

Additional aspects of the present disclosure will be set forth, in part, in the detailed description, figures and any claims which follow, and in part will be derived from the detailed description or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIGS. 5A-5C (PRIOR ART) is a call flow diagram used to describe in more detail the problem associated with the SgNB addition request rejections;

FIGS. 7A-7L (PRIOR ART) is a call flow diagram used to describe in more detail the problem associated with the SCG failures;

DETAILED DESCRIPTION

The present disclosure is related to NR technology and is applicable to NR NSA case where EN-DC capable UE has simultaneous connectivity to eNB (4G LTE) and gNB (5G). When the EN-DC capable UE has simultaneous connectivity to eNB and gNB then all EN-DC related control signalling happens via an LTE master node and user plane signalling can happen via both LTE and NR depending upon certain procedures. However, in the state-of-the-art during an EN-DC call setup there can be problematic SgNB addition rejections and SCG failures which happen with the same NR cell (see Background Discussion). The present disclosure provides solutions for the problems associated with continuous SgNB addition request rejections and/or SCG failures that happen during an EN-DC call and can be used both for Frequency Range 1 (FR1) and Frequency Range 2 (FR2) frequencies.

In particular, the present solutions aim at improving the probability of SCG bearer setup by allowing the setup request to be sent to an alternative candidate SgNB/NR cell, in case it exists, instead of repeatedly persisting with the initial SgNB/NR cell candidate after experiencing a predetermined number of SgNB addition request rejections or SCG failures. This improves the user's 5G experience while also improving the network performance indicators pertaining to EN-DC setup or NSA NR retainability. And in the absence of any valid alternative SgNB/NR cell, the serving UE suspends EN-DC setup for a preconfigured time thereby allowing the UE to continue the data session on LTE uninterrupted before resuming the process of B1 measurement for identifying suitable SgNB/NR cell candidates for EN-DC setup. The present solution reduces network and UE signalling load. Further, the present solutions and various embodiments thereof are described in detail below with respect to FIGS. 8-13.

The present solutions generally include the following features:

1. The solutions aim to mitigate the aforementioned problems by placing a condition on a number of multiple SgNB addition request rejections or multiple SCG failures from same NR cell.
2. The MeNB 1100 would configure the UE 1300 with parameters to penalize a NR cell (associated with a SgNB) from which there have been continuous SgNB addition request rejections or SCG failures. In particular, the UE 1300 would not report the penalized NR cell in a B1 measurement report for a particular time period.
3. After expiry of timer, the UE 1300 would measure all of the NR cells (including the previously penalized NR cell) and send a new B1 measurement report with all the measured NR cells.

Figure 1:
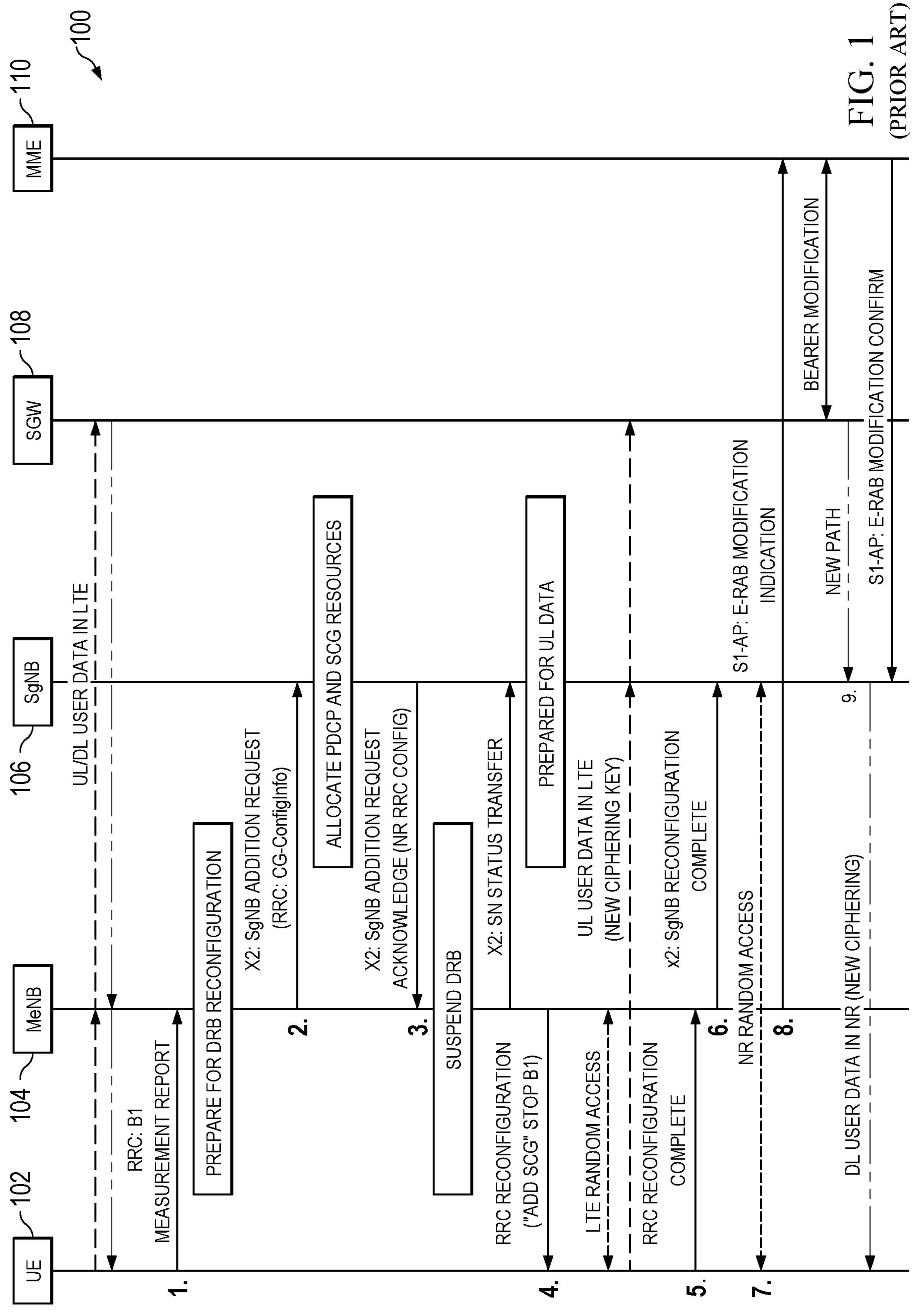
FIG. 1 (PRIOR ART)
FIG. 1 (PRIOR ART) is a NR NSA signalling flow diagram illustrating a NR leg setup procedure.
Figure 2:
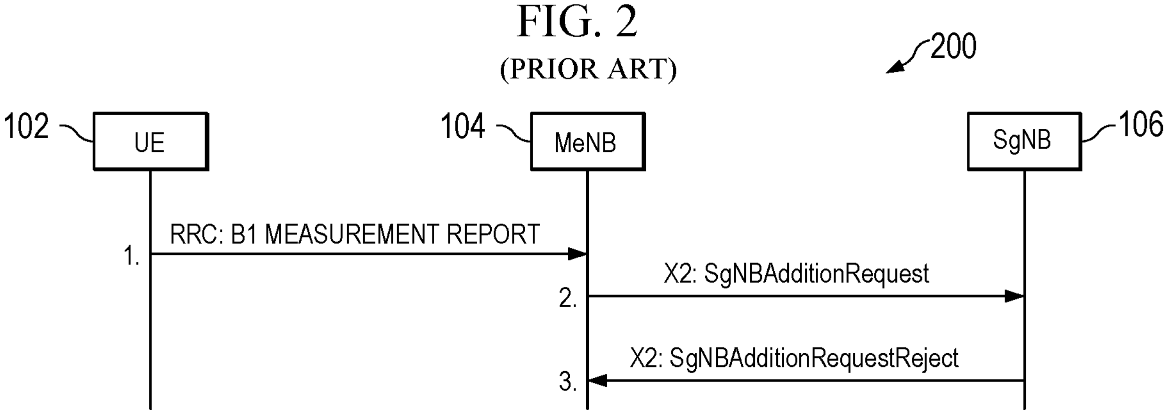
FIG. 2 (PRIOR ART)
FIG. 2 (PRIOR ART) is a signalling flow diagram used to explain a SgNB addition request rejection.
Figure 4:
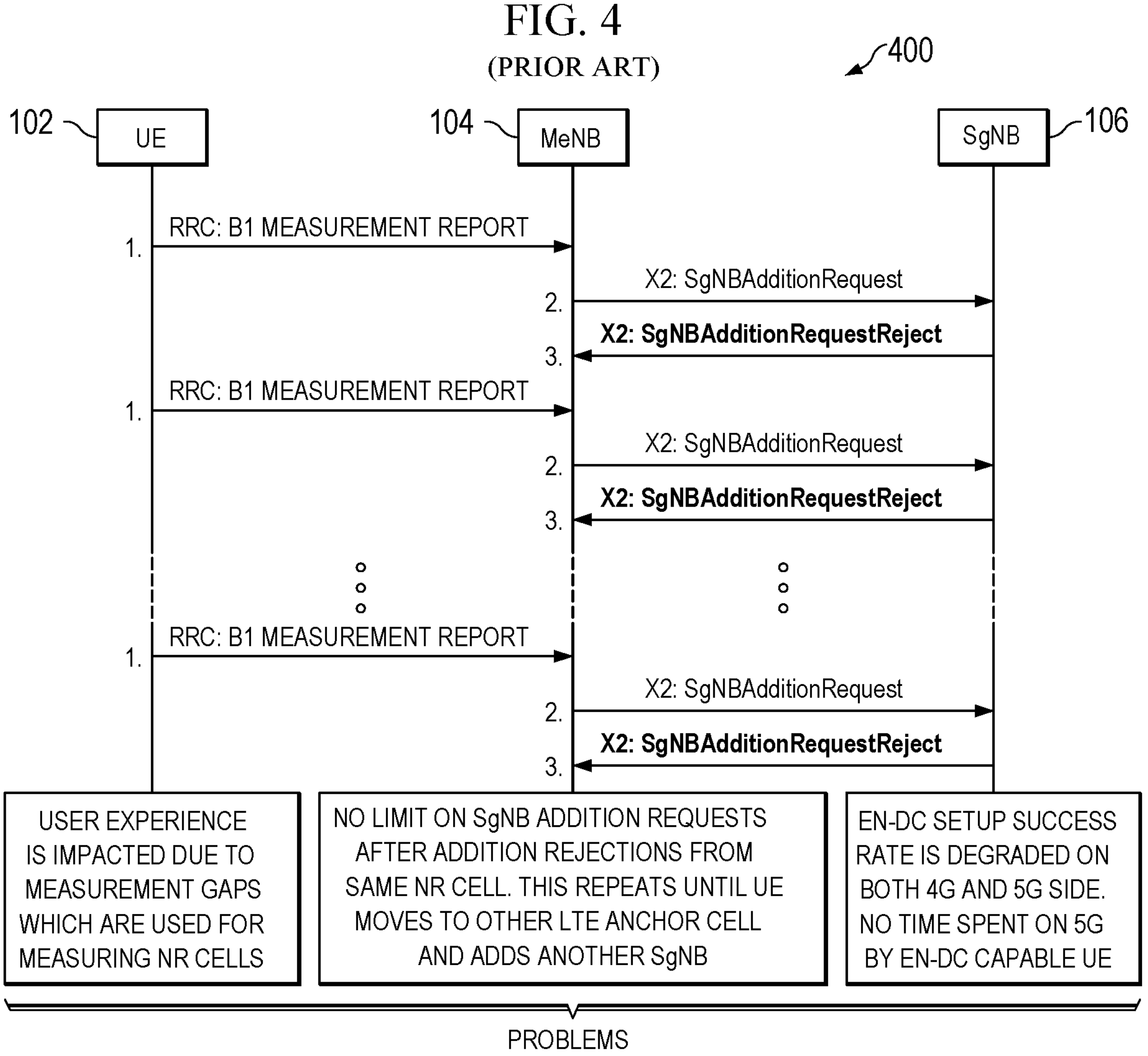
FIG. 4 (PRIOR ART)
FIG. 4 (PRIOR ART) is signalling flow diagram used to describe in more detail a problem associated with the SgNB addition request rejections.
Figure 3:
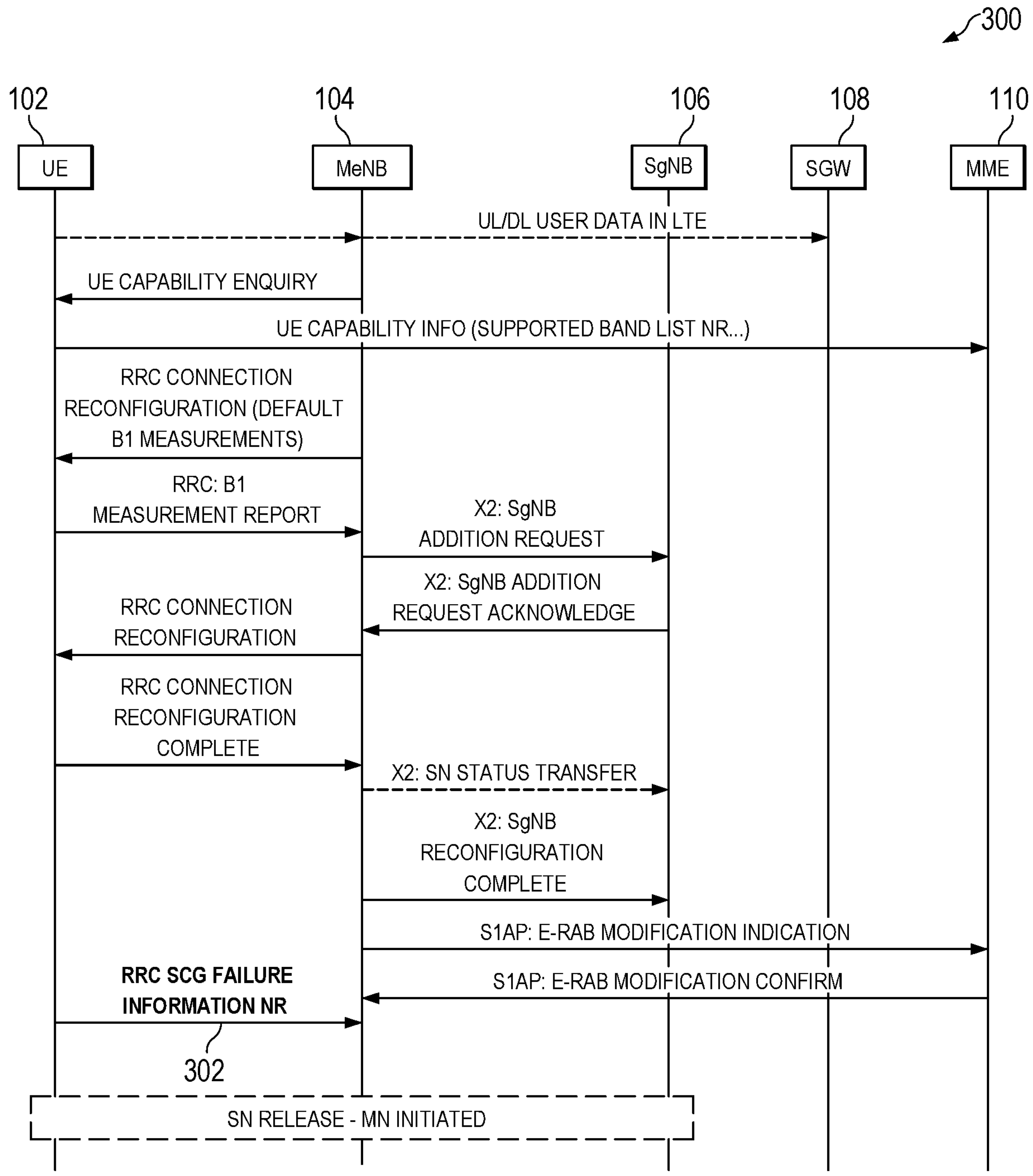
FIG. 3 (PRIOR ART)
FIG. 3 (PRIOR ART) is a signalling flow diagram used to explain a SCG failure indication.
Figure 6:
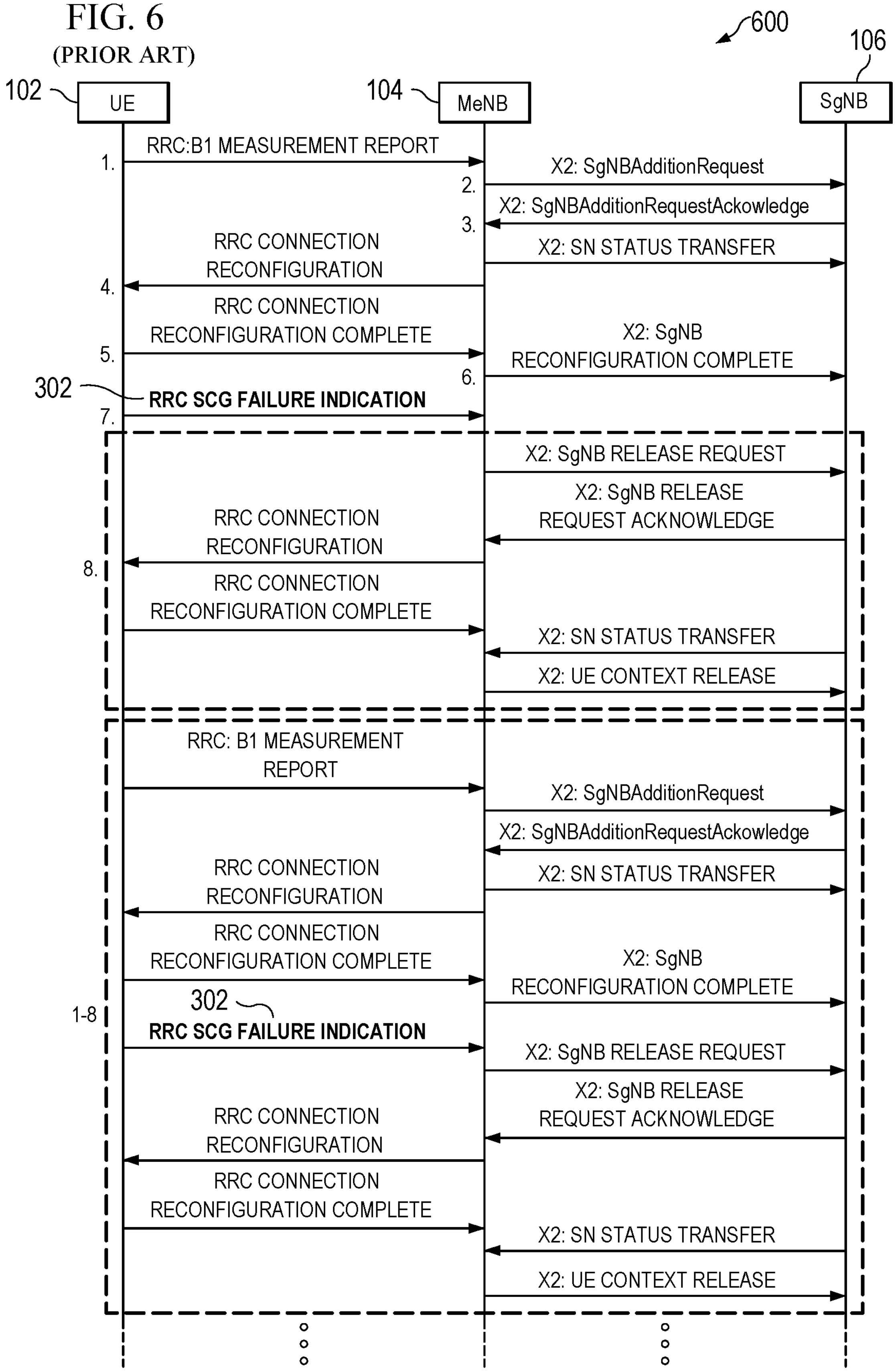
FIG. 6 (PRIOR ART)
FIG. 6 (PRIOR ART) is a signalling flow diagram used to describe in more detail the problem associated with the SCG failures.
Figure 8:
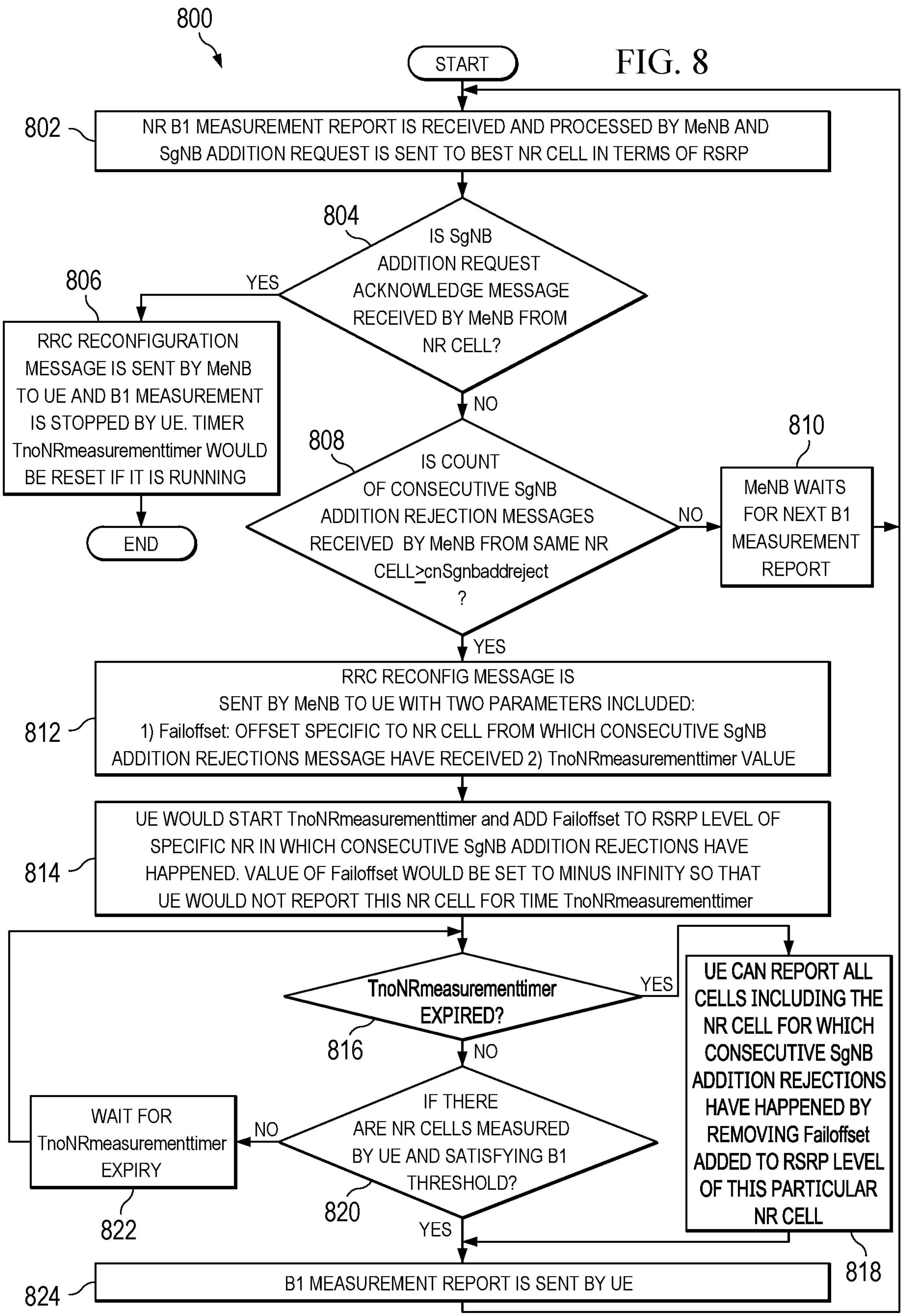
FIG. 8 is a flowchart of a method illustrating the steps for one exemplary way that the MeNB and UE can address the problem associated with continuous SgNB addition request rejections for a NR cell in accordance with an embodiment of the present disclosure.

FIG. 8 is a flowchart of a method 800 illustrating the steps for one exemplary way that the MeNB 1100 and the UE 1300 can address the problem associated with continuous SgNB addition request rejects from a NR cell in accordance with an embodiment of the present disclosure. The steps of the method 800 are discussed next:

Step 802: As per the current EN-DC setup call flow, the MeNB 1100 evaluates the B1 Measurement Report received from the EN-DC capable UE 1300 and sends a SgNB Addition Request message to the SgNB associated with the NR cell reported by the UE 1300 as having the best RSRP (see FIG. 1 for current EN-DC setup call flow).

Steps 804 and 806. If the MeNB 1100 at step 804 receives a SgNB Addition Request Acknowledge message from the SgNB, then the SgNB addition was successful and the further call flow per step 806 will happen according to the current EN-DC setup call flow except for the use by the UE 1300 of a new timer 1302 referred to herein as TnoNRmeasurementtimer 1302. At step 806, the RRC reconfiguration message is sent by the MeNB 1100 to the UE 1300 and the B1 measurement is stopped by the UE 1300 and the TnoNRmeasurementtimer 1302 would be reset if it is running. Note 1: the MeNB 1100 would receive either SgNB addition Request Acknowledge message or a SgNB addition request reject message after sending SgNB addition request message to the SgNB which controls the NR cell with the best RSRP.

Step 808. If the MeNB 1100 receives a SgNB Addition Request Reject message, then the MeNB 1100 will evaluate additional conditions and act according to the new solution discussed next with respect to steps 810, 812, 814, 816, 818, 820, 822, and 824.

Step 810. If per step 808 the count of consecutive SgNB Addition Request Reject messages received from same NR cell (SgNB) is less than a threshold which is referred to herein as cnSgNBaddreject, then at step 810 the MeNB 1100 will wait for another B1 measurement report and then the next action would be according to step 802.

The cnSgNBaddreject is a new proposed parameter to define a count of consecutive SgNB Addition Request Rejections. The cnSgNBaddreject is operator configurable and can have the following: range: {0 . . . 500}; unit: absolute number; and scope: Internal to MeNB 1100.

Step 812. If per step 808 the count of consecutive SgNB Addition Request Reject messages received from same NR cell (SgNB) is greater than or equal to threshold cnSgNBaddreject, then at step 812 the MeNB 1100 will send a RRC Reconfiguration message with two new parameters included therein to the UE 1300. These two new parameters are referred to herein as TnoNRmeasurementtimer 1302 value and Failoffset 1304 and are defined as follows:

TnoNRmeasurementtimer 1302 is a new proposed parameter for the UE 1300. The UE 1300 would not measure specific NR cell from which consecutive SgNB addition rejections messages or RRC SCG failure messages (discussed below) have been received until the expiration of this timer 1302. For example, the timer 1302 can have a range: {0 . . . 100}, a unit: seconds, and utilize 7 bits. The value of the timer 1302 would be transmitted by the MeNB 1100 to the UE 1300 via the RRC_Connection_Reconfiguration message.

Failoffset 1304 is a new proposed parameter to define an offset specific to the NR cell from which consecutive SgNB addition rejections or RRC SCG failure messages (discussed below) have been received. The Failoffset 1304 can have a value of infinity. The Failoffset 1304 would be transmitted by the MeNB 1100 to the UE 1300 via the RRC_Connection_Reconfiguration message.

Step 814. After step 812, the UE 1300 per step 814 would start the timer 1302 and add the Failoffset 1304 to the RSRP level of the specific NR cell from which consecutive SgNB addition rejection messages have been received. The value of Failoffset 1304 would be set to minus infinity so that the UE 1300 would not report this NR cell for the time remaining in TnoNRmeasurementtimer 1302 in a B1 measurement report to MeNB 1100.

Steps 816 and 818. If at step 816 the timer TnoNRmeasurementtimer 1302 is expired then the UE 1300 at step 818 can report in a B1 measurement report all cells including the NR cell for which consecutive SgNB addition rejections have happened by removing the Failoffset 1304 added to RSRP level of this particular NR cell.

Steps 816 and 820. If at step 816 the timer TnoNRmeasurementtimer 1302 has not expired then the UE 1300 at step 820 would check if there are NR cell(s) (not counting the NR cell associated with the Failoffset 1304) measured by the UE 1300 that satisfy the blthreshold.

Step 822. If at step 820 the UE 1300 has not found NR cell(s) (not counting the NR cell associated with the Failoffset 1304) that satisfy the b1 threshold, then at step 822 the UE 1300 waits for the expiry of the timer TnoNRmeasurementtimer 1302 and then returns to step 816.

Step 824. If at step 820 the UE 1300 has found NR cell(s) that satisfy the b1 threshold, then at step 824 the UE 1300 would send the B1 Measurement for those measured NR cell(s), and if still running, the timer TnoNRmeasurementtimer 1302 would be reset when the SgNB addition procedure for a NR cell was successful. Then, the method 800 returns to step 802 and continues.

It should be appreciated that the MeNB 1100, UE 1300, and SgNB discussed above with respect to FIG. 8 will operate as per FIGS. 1-7 but per the present solution will also keep track of the number of SgNB Addition Request Reject messages for same NR cell and once that number passes a certain threshold cnSgNBaddreject they will no longer operate per FIGS. 1-7 but instead will perform steps 808, 810, 812, 814, 816, 818, 820, 822, and 824.

Figure 9:
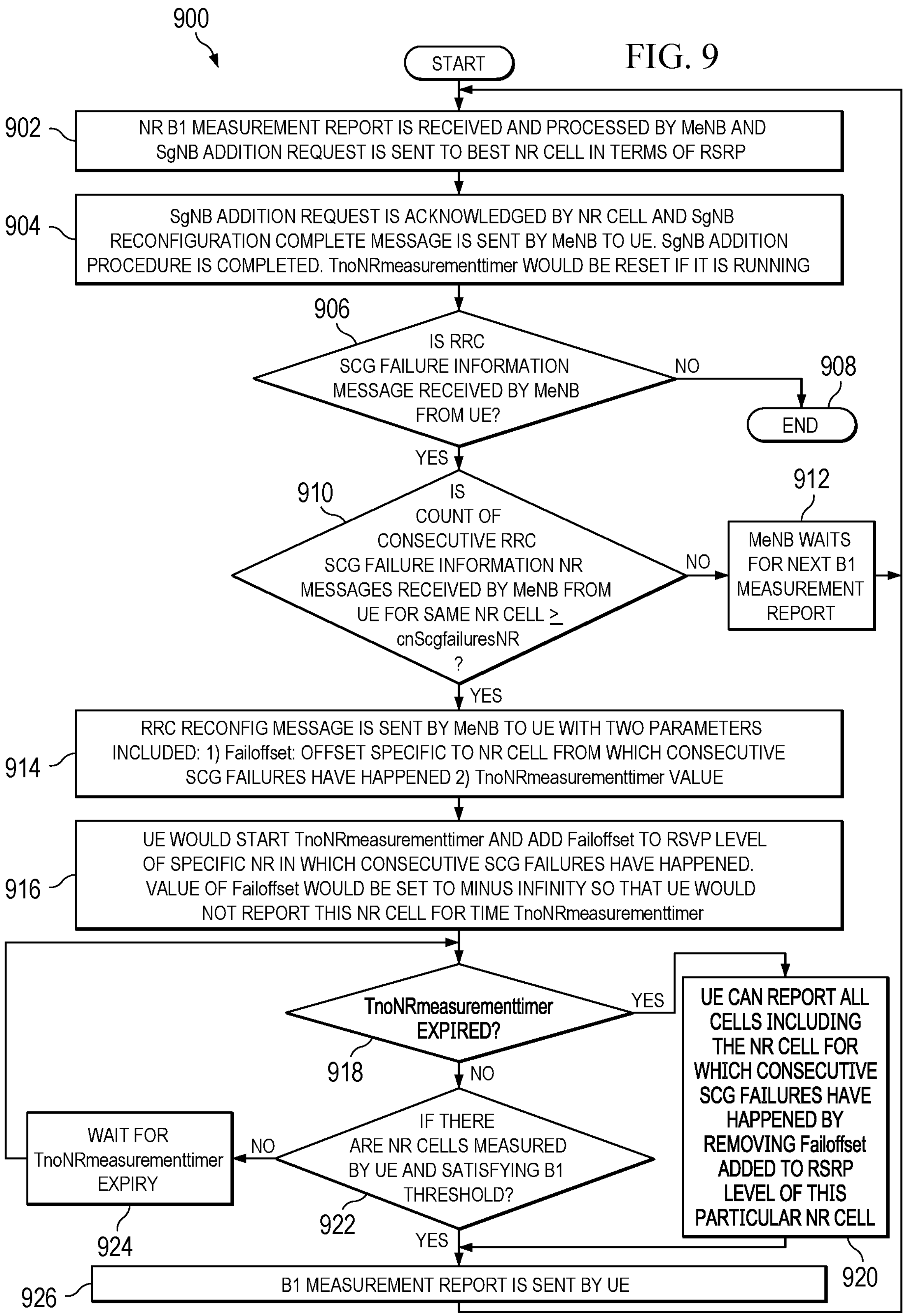
FIG. 9 is a flowchart of a method illustrating the steps for one exemplary way that the MeNB and UE can address the problem associated with continuous SCG failures for a NR cell in accordance with an embodiment of the present disclosure.

FIG. 9 is a flowchart of a method 900 illustrating the steps for one exemplary way that the MeNB 1100 and the UE 1300 can address the problem associated with continuous SCG failures from a NR cell in accordance with an embodiment of the present disclosure. The steps of the method 900 are discussed next:

Step 902: As per the current EN-DC setup call flow, the MeNB 1100 evaluates the B1 Measurement Report received from the EN-DC capable UE 1300 and sends a SgNB Addition Request message to the SgNB associated with the NR cell reported by the UE 1300 as having the best RSRP (see FIG. 1 for current EN-DC setup call flow).

Step 904. If the MeNB 1100 at step 904 receives a SgNB Addition Request Acknowledge message from the SgNB (NR cell with best RSRP) indicating that the SgNB addition was successful, then the MeNB 1100 sends the RRC Connection Reconfiguration Complete message to the UE 1300 (see FIGS. 3 and 6). At this point, the SgNB addition procedure is completed, and the UE 1300 would reset the TnoNRmeasurementtimer 1302 (recall the timer 1302 is part of the present solution and not part of the current EN-DC setup call flow).

Step 906. The MeNB 1100 determines at step 906 whether or not it receives a RRC SCG failure information message from the UE 1300.

Step 908: If the MeNB 1100 determines at step 906 that it did not receive a RRC SCG failure information message from the UE 1300, then the MeNB 1100 at step 908 ends the new solution and continues with the conventional call setup.

Step 910. If the MeNB 1100 determines at step 906 that it did receive a RRC SCG failure information message from the UE 1300, then the MeNB 1100 at step 910 will evaluate additional conditions and act according to the new solution discussed next with respect to steps 912, 914, 916, 918, 920, 922, 924, and 926. In particular, at step 910 the MeNB 1100 will determine if a count of the consecutive RRC SCG failure information NR messages received by MeNB 1100 from the UE 1300 for the same NR cell is greater than or equal to a threshold which is referred to herein as cnScgfailuresNR.

The cnScgfailuresNR is a new proposed parameter to define a count of consecutive RRC SCG failure messages. The cnScgfailuresNR is operator configurable and can have the following: range: {0 . . . 500}; unit: absolute number; and scope: Internal to MeNB 1100.

Step 912: If the MeNB 1100 at step 910 determines that the count of consecutive RRC SCG failure information NR messages received from the UE 1300 for same NR cell is less than the threshold cnScgfailuresNR, then the MeNB 1100 at step 912 will wait for another B1 measurement report and then the next action would be according to step 902.

Step 914: If the MeNB 1100 at step 910 determines that the count of consecutive RRC SCG failure information NR messages received from the UE 1300 for the same NR cell is greater than or equal to the threshold cnScgfailuresNR, then the MeNB 1100 at step 914 will send a RRC Reconfiguration message with two new parameters included therein to the UE 1300. These two new parameters are referred to herein as the TnoNRmeasurementtimer 1302 value and Failoffset 1304 (see their definitions above with respect to FIG. 8).

Step 916: After step 914, the UE 1300 per step 916 would start the timer 1302 and add the Failoffset 1304 to the RSRP level of the specific NR cell from which consecutive SCG addition failures have been received. The value of Failoffset 1304 would be set to minus infinity so that the UE 1300 would not report this NR cell for the time remaining in TnoNRmeasurementtimer 1302 in a B1 measurement report to the MeNB 1100.

Steps 918 and 920. If at step 918 the timer TnoNRmeasurementtimer 1302 is expired then the UE 1300 at step 920 can report all NR cells in a B1 measurement report including the NR cell for which consecutive SCG failures have happened by removing the Failoffset 1304 added to RSRP level of this particular NR cell.

Steps 918 and 922. If at step 918 the timer TnoNRmeasurementtimer 1302 has not expired then the UE 1300 at step 922 would check if there are NR cell(s) (not counting the NR cell associated with the Failoffset 1304) measured by the UE 1300 that satisfy the b1threshold.

Step 924. If at step 922 the UE 1300 has not found NR cell(s) that satisfy the b1 threshold, then at step 924 the UE 1300 waits for the expiry of the timer TnoNRmeasurementtimer 1302 and then returns to step 918.

Step 926. If at step 922 the UE 1300 has found NR cell(s) that satisfy the b1 threshold, then at step 926 the UE 1300 would send the B1 Measurement for those measured NR cell(s), and if still running, the timer TnoNRmeasurementtimer 1302 would be reset when the SCG procedure for a NR cell was successful. Then, the method 900 returns to step 902 and continues.

It should be appreciated that the MeNB 1100, UE 1300, and SgNB discussed above with respect to FIG. 9 will operate as per FIGS. 1-7 but per the present solution will also keep track of the number of SCG failures for the same NR cell, and once that number passes a certain threshold cnScgfailuresNR they will no longer operate per FIGS. 1-7 but instead will perform steps 910, 912, 914, 916, 918, 920, 922, 924, and 926.

Figure 10:
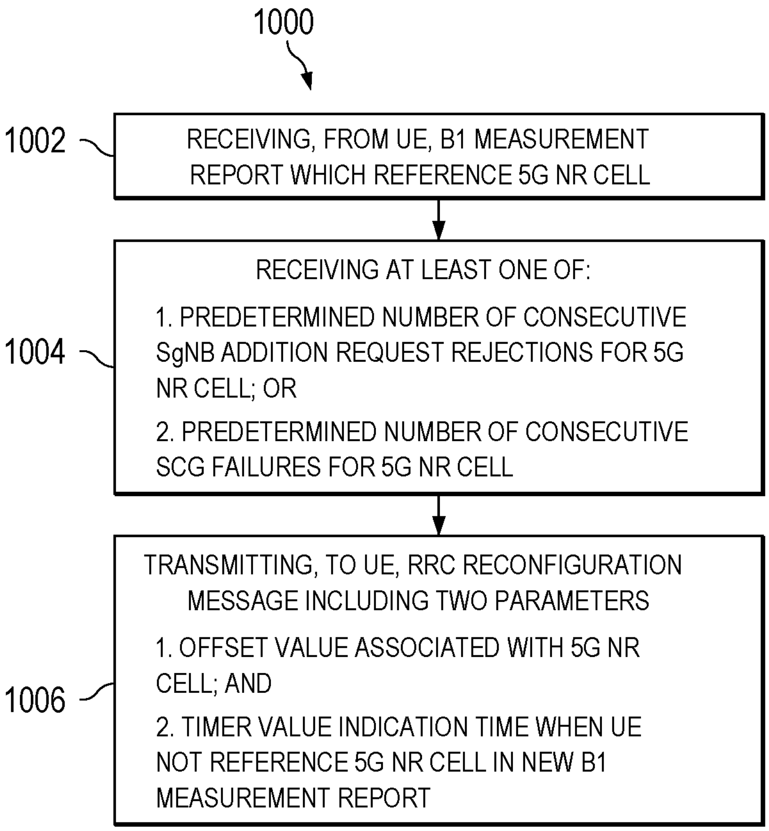
FIG. 10 is a flowchart of a method implemented by the MeNB (4G network node) in accordance with an embodiment of the present disclosure.

Referring to FIG. 10, there is a flowchart of a method 1000 implemented by the MeNB 1100 (4G network node 1100) in accordance with an embodiment of the present disclosure. At step 1002, the MeNB 1100 receives, from the UE 1300 (terminal node 1300), a B1 measurement report which references a 5G NR cell that has the best RSRP. At step 1004, the MeNB 1100 receives at least one of the following: (1) a predetermined number of consecutive SgNB addition rejections associated with the 5G NR cell (the SgNB addition request rejections are received from the SgNB/5G network node); or (2) a predetermined number of consecutive SCG failures associated with the 5G NR cell (the SCG failures are received from the UE 1300). Upon receiving the predetermined number of consecutive SgNB addition rejections associated with the 5G NR cell or the predetermined number of consecutive SCG failures associated with the 5G NR cell, at step 1006 the MeNB 1100 transmits to the UE 1300 a RRC reconfiguration message having at least two parameters: (1) an offset value 1304 to be associated with the 5G NR cell, and (2) a timer value (associated with timer 1302) indicating a period of time where the UE 1300 will not reference the 5G NR cell in a new B1 measurement report. It should be appreciated that the MeNB 1100 as discussed above with respect to FIGS. 8-9 will operate as per FIGS. 1-7 but per the present solution will also keep track of the number of SgNB addition request rejections and SCG failures for the same 5G NR cell, and once either of those numbers passes their respective threshold then the MeNB 1100 will no longer operate per FIGS. 1-7 but instead will perform steps 1004 and 1006.

Figure 11:
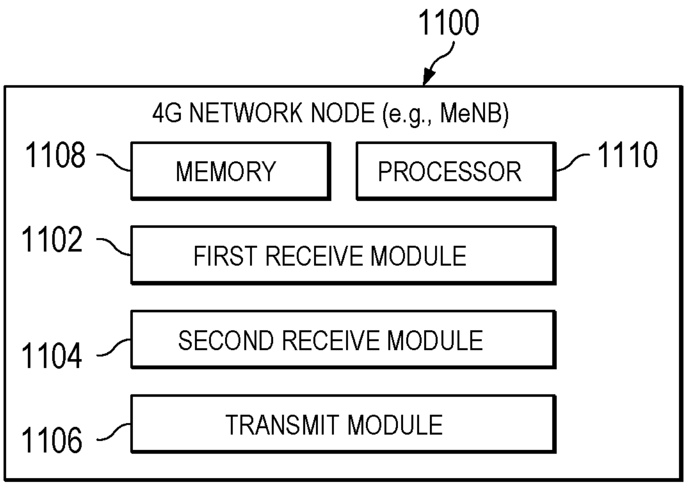
FIG. 11 is a block diagram illustrating a structure of the MeNB (4G network node) configured in accordance with an embodiment of the present disclosure.

Referring to FIG. 11, there is a block diagram illustrating structures of an exemplary MeNB 1100 (e.g., 4G network node 1100) configured in accordance with an embodiment of the present disclosure. The MeNB 1100 comprises a first receive module 1102, a second receive module 1104, and a transmit module 1106. The first receive module 1102 is configured to receive, from the UE 1300, a B1 measurement report which references a 5G NR cell that has the best RSRP. The second receive module 1104 is configured to receive at least one of the following: (1) a predetermined number of consecutive SgNB addition rejections associated with the 5G NR cell (the SgNB addition request rejections are received from the SgNB/5G network node); or (2) a predetermined number of consecutive SCG failures associated with the 5G NR cell (the SCG failures are received from the UE 1300). Upon receiving the predetermined number of consecutive SgNB addition rejections associated with the 5G NR cell or the predetermined number of consecutive SCG failures associated with the 5G NR cell, the transmit module 1106 is configured to transmit to the UE 1300 a RRC reconfiguration message having at least two parameters: (1) an offset value 1304 to be associated with the 5G NR cell, and (2) a timer value (associated with timer 1302) indicating a period of time where the UE 1300 will not reference the 5G NR cell in a new B1 measurement report. It should be appreciated that the MeNB 1100 may also include other components, modules or structures which are well-known, but for clarity, only the components, modules or structures needed to describe the features of the present disclosure are described herein.

As those skilled in the art will appreciate, the above-described modules 1102, 1104, and 1106 of the MeNB 1100 may be implemented as suitable dedicated circuit. Further, the modules 1102, 1104, and 1106 can also be implemented using any number of dedicated circuits through functional combination or separation. In some embodiments, the modules 1102, 1104, and 1106 may even be combined in a single application specific integrated circuit (ASIC). As an alternative software-based implementation, the MeNB 1100 may comprise processing circuitry which may comprise a memory 1108 and a processor 1110 (including but not limited to a microprocessor, a microcontroller, or a Digital Signal Processor (DSP), etc.). The memory 1108 stores machine-readable program code executable by the processor 1110 to cause the MeNB 1100 to perform the steps of the above-described methods associated with FIGS. 8-10.

Figure 12:
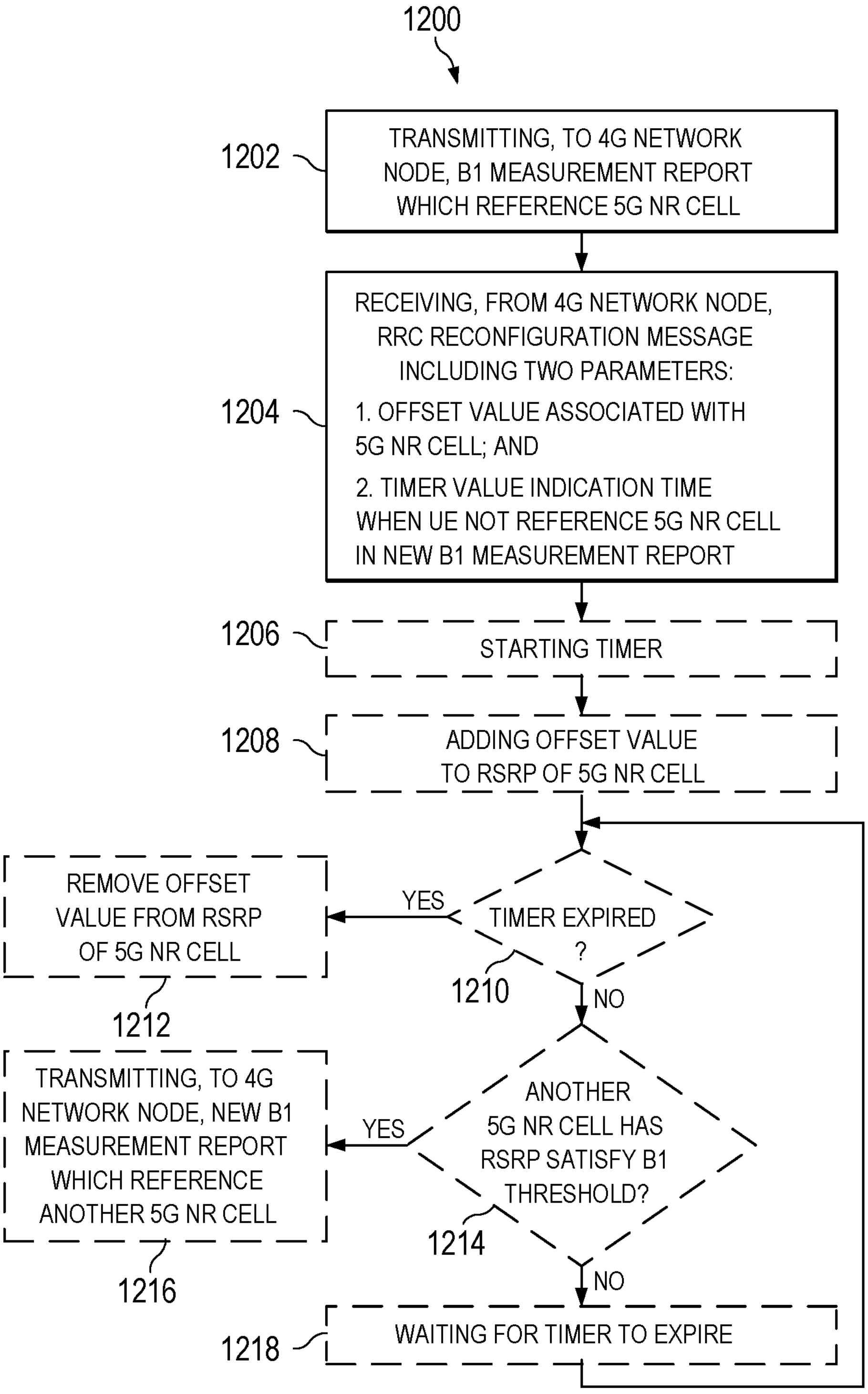
FIG. 12 is a flowchart of a method implemented by the UE (terminal node) in accordance with an embodiment of the present disclosure.

Referring to FIG. 12, there is a flowchart of a method 1200 implemented by the UE 1300 (terminal node 1300) in accordance with an embodiment of the present disclosure. At step 1202, the UE 1300 transmits, to the MeNB 1100, a B1 measurement report which references a 5G NR cell that has the best RSRP. At step 1204, the UE 1300 receives, from the MeNB 1100, a RRC reconfiguration message having at least two parameters: (1) an offset value 1304 associated with the 5G NR cell that has been associated with a predetermined number of consecutive SgNB addition rejections or a predetermined number of consecutive SCG failures; and (2) a timer value (associated with timer 1302) indicating a period of time where the UE 1300 will not reference the 5G NR cell in a new B1 measurement report.

At steps 1206 and 1208, the UE 1300 starts the timer 1302 and adds the offset value 1304 to the RSRP of the 5G NR cell. The offset value 1304 has been set such that the UE 1300 would not report the 5G NR cell in the new B1 measurement report while the timer 1302 is running. At step 1210, the UE 1300 determines whether or not the timer 1302 has expired. Based on the determination at step 1210 that the timer 1302 has expired, the UE 1300 at step 1212 removes the offset value 1304 from the RSRP of the 5G NR cell which permits the 5G NR cell to be added in the new B1 measurement report transmitted to the MeNB 1100. Based on the determination at step 1210 that the timer 1302 has not expired, the UE 1300 determines at step 1214 whether another 5G NR cell has a RSRP satisfying a B1 report threshold. Based on the determination at step 1214 that another 5G NR cell has the RSRP satisfying the B1 report threshold, the UE 1300 at step 1216 transmits the new B1 measurement report which references the another 5G NR cell to the MeNB 1100. Based on the determination at step 1214 that another 5G NR cell does not have the RSRP satisfying the B1 report threshold, the UE 1300 at step 1218 waits for the timer 1302 to expire and then returns to step 1210. It should be appreciated that the UE 1300 as discussed above with respect to FIGS. 8-9 will operate as per FIGS. 1-7 but per the present solution will also, once informed by the RRC reconfiguration message that the number of SgNB addition request rejections or SCG failures for the same 5G NR cell passed their respective threshold, then the UE 1300 will no longer operate per FIGS. 1-7 but instead will perform steps 1204, 1206, 1208, 1210, 1212, 1214, 1216, and 1218.

Figure 13:
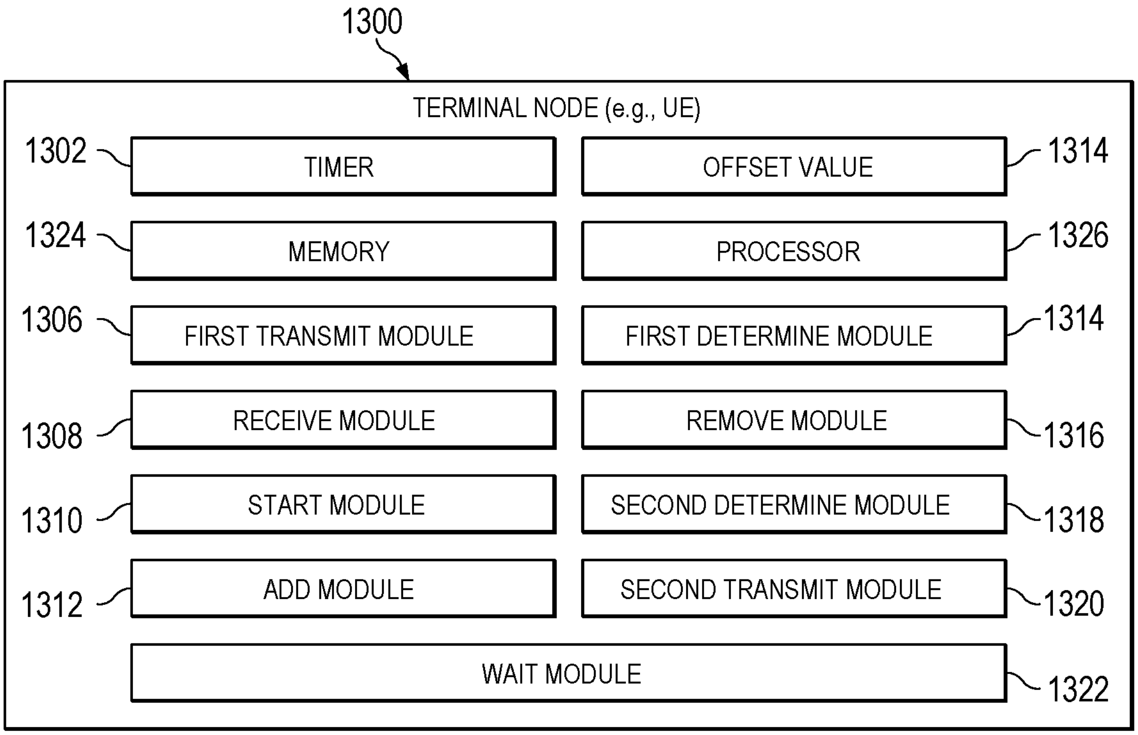
FIG. 13 is a block diagram illustrating a structure of the UE (terminal node) configured in accordance with an embodiment of the present disclosure.

Referring to FIG. 13, there is a block diagram illustrating structures of an exemplary UE 1300 (e.g., terminal node 1300) configured in accordance with an embodiment of the present disclosure. The UE 1300 comprises a first transmit module 1306, a receive module 1308, a start module 1310, an add module 1312, a first determine module 1314, a remove module 1316, a second determine module 1318, a second transmit module 1320, and a wait module 1322. The first transmit module 1306 is configured to transmit, to the MeNB 1100, a B1 measurement report which references a 5G NR cell that has the best RSRP. The receive module 1308 is configured to receive, from the MeNB 1100, a RRC reconfiguration message having at least two parameters: (1) an offset value 1304 associated with the 5G NR cell that has been associated with a predetermined number of consecutive SgNB addition rejections or a predetermined number of consecutive SCG failures; and (2) a timer value (associated with timer 1302) indicating a period of time where the UE 1300 will not reference the 5G NR cell in a new B1 measurement report. The start module 1310 is configured to start the timer 1302. The add module 1312 is configured to add the offset value 1304 to the RSRP of the 5G NR cell. The offset value 1304 has been set such that the UE 1300 would not report the 5G NR cell in the new B1 measurement report while the timer 1302 is running. The first determine module 1314 is configured to determine whether or not the timer 1302 has expired. Based on the determination that the timer 1302 has expired, the remove module 1316 is configured to remove the offset value 1304 from the RSRP of the 5G NR cell which permits the 5G NR cell to be added in the new B1 measurement report transmitted to the MeNB 1100. Based on the determination that the timer 1302 has not expired, the second determine module 1318 is configured to determine whether another 5G NR cell has a RSRP satisfying a B1 report threshold. Based on the determination that another 5G NR cell has the RSRP satisfying the B1 report threshold, the second transmit module 1320 is configured to transmit the new B1 measurement report which references the another 5G NR cell to the MeNB 1100. Based on the determination that another 5G NR cell does not have the RSRP satisfying the B1 report threshold, the wait module 1322 is configured to wait for the timer 1302 to expire and then return the operations to the first determine module 1314. It should be appreciated that the UE 1300 may also include other components, modules or structures which are well-known, but for clarity, only the components, modules or structures needed to describe the features of the present disclosure are described herein.

As those skilled in the art will appreciate, the above-described modules 1306, 1308, 1310, 1312, 1314, 1316, 1318, 1320, and 1322 of the UE 1300 may be implemented as suitable dedicated circuit. Further, the modules 1306, 1308, 1310, 1312, 1314, 1316, 1318, 1320, and 1322 can also be implemented using any number of dedicated circuits through functional combination or separation. In some embodiments, the modules 1306, 1308, 1310, 1312, 1314, 1316, 1318, 1320, and 1322 may even be combined in a single application specific integrated circuit (ASIC). As an alternative software-based implementation, the UE 1300 may comprise processing circuitry which may comprise a memory 1324 and a processor 1326 (including but not limited to a microprocessor, a microcontroller, or a Digital Signal Processor (DSP), etc.). The memory 1324 stores machine-readable program code executable by the processor 1326 to cause the UE 1300 to perform the steps of the above-described methods associated with FIGS. 8-9 and 12.

Exemplary Advantages of Present Solution

The present solution addresses the problem associated with the prior art by providing 4G network node 1100 (and a method 1000 implemented thereby) and a terminal node 1300 (and a method 1200 implemented thereby) all of which improve the probability of the SCG bearer setup by allowing the setup request to be sent to an alternative candidate SgNB (NR cell), in case it exists, instead of repeatedly persisting with the initial SgNB (NR cell) candidate which sends SgNB addition request rejections or SCG failures for a predefined number of times. This helps to improve the user's 5G experience while the network performance indicators pertaining to EN-DC setup or NSA NR retainability also improve. In the absence of any valid alternative SgNB, the serving UE 1300 suspends EN-DC setup for a preconfigured time thereby allowing the UE 1300 to continue the data session on LTE uninterrupted before resuming the process of B1 measurement for identifying suitable SgNB candidates for EN-DC setup. This solution reduces network and UE signaling load. In addition, the present solution has some additional advantages as follows:

1. Potentially reduce the probability of an attempt to add a NR cell for which SgNB addition rejections or SCG failures have been repeatedly reported. This will improve EN-DC Setup Success Rate, EN-DC Retainability, DL and UL user throughput, and overall user experience.
2. By penalizing the best reported NR cell where SgNB addition failed or SCG Failure Indication was reported by UE 1300 previously, the UE 1300 can report an alternative NR candidate cell (satisfying B1 threshold criteria) where SgNB addition request can be sent. This will lead to faster NR leg establishment compared to repeated failures as observed in the current state-of-the-art implementation which delays the overall data connection setup.

3. Possible reduction in signalling load on LTE side which increases due to continuous SgNB addition request messages, B1 measurement report handling, and SgNB release requests when repeatedly attempting on same NR candidate cell.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 14A:
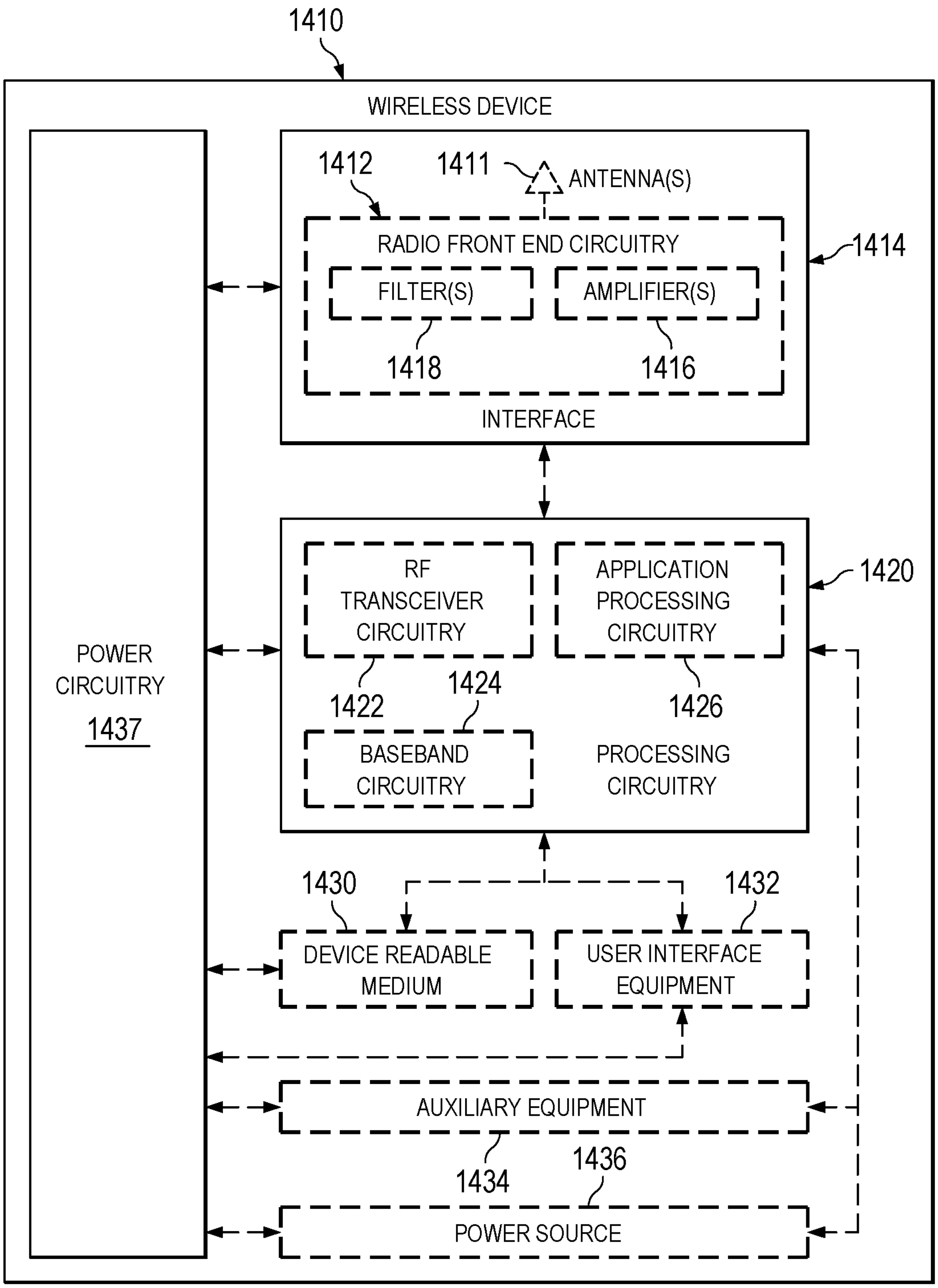
FIGS. 14A-14B is an illustration of a wireless network including a wireless device and network node configured in accordance with an embodiment of the present disclosure.
Figure 14B:
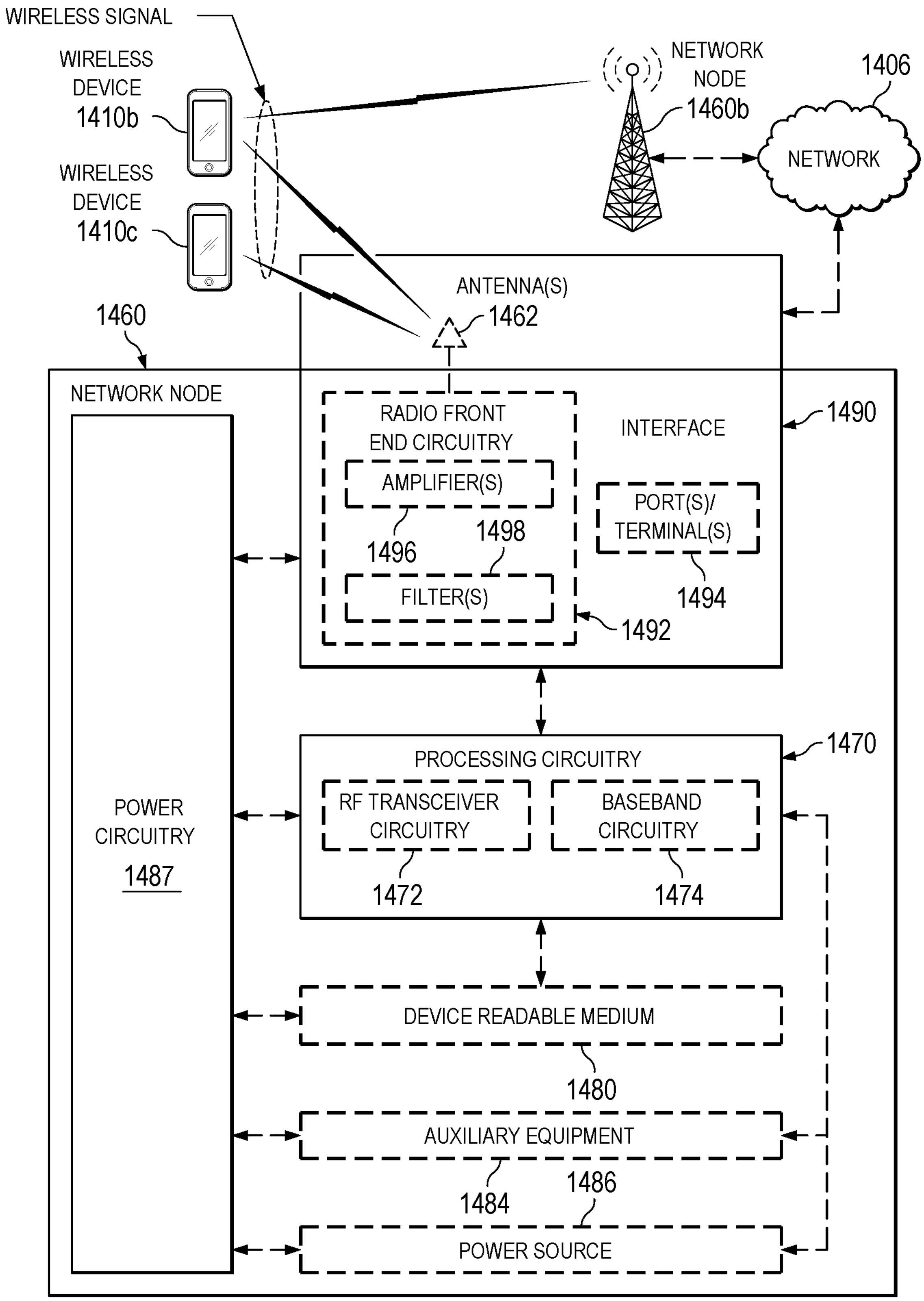

Although the subject matter described herein may be implemented in any appropriate type of system using any suitable components, the embodiments disclosed herein are described in relation to a wireless network, such as the example wireless network illustrated in FIGS. 14A-14B. For simplicity, the wireless network of FIGS. 14A-14B only depicts network 1406, network nodes 1460 and 1460*b*, and WDs 1410, 1410*b*, and 1410*c*. In practice, a wireless network may further include any additional elements suitable to support communication between wireless devices or between a wireless device and another communication device, such as a landline telephone, a service provider, or any other network node or end device. Of the illustrated components, network node 1460 and wireless device (WD) 1410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1460 and WD 1410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIGS. 14A-14B, network node 1460 includes processing circuitry 1470, device readable medium 1480, interface 1490, auxiliary equipment 1484, power source 1486, power circuitry 1487, and antenna 1462. Although network node 1460 illustrated in the example wireless network of FIGS. 14A-14B may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1460 are depicted as single boxes located within a larger box, or nested within multiple boxes, in practice, a network node may comprise multiple different physical components that make up a single illustrated component (e.g., device readable medium 1480 may comprise multiple separate hard drives as well as multiple RAM modules).

Similarly, network node 1460 may be composed of multiple physically separate components (e.g., a NodeB component and a RNC component, or a BTS component and a BSC component, etc.), which may each have their own respective components. In certain scenarios in which network node 1460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1460 may be configured to support multiple radio access technologies (RATs). In such embodiments, some components may be duplicated (e.g., separate device readable medium 1480 for the different RATs) and some components may be reused (e.g., the same antenna 1462 may be shared by the RATs). Network node 1460 may also include multiple sets of the various illustrated components for different wireless technologies integrated into network node 1460, such as, for example, GSM, WCDMA, LTE, NR, WiFi, or Bluetooth wireless technologies. These wireless technologies may be integrated into the same or different chip or set of chips and other components within network node 1460.

Processing circuitry 1470 is configured to perform any determining, calculating, or similar operations (e.g., certain obtaining operations) described herein as being provided by a network node. These operations performed by processing circuitry 1470 may include processing information obtained by processing circuitry 1470 by, for example, converting the obtained information into other information, comparing the obtained information or converted information to information stored in the network node, and/or performing one or more operations based on the obtained information or converted information, and as a result of said processing making a determination.

Processing circuitry 1470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1460 components, such as device readable medium 1480, network node 1460 functionality. For example, processing circuitry 1470 may execute instructions stored in device readable medium 1480 or in memory within processing circuitry 1470. Such functionality may include providing any of the various wireless features, functions, or benefits discussed herein. In some embodiments, processing circuitry 1470 may include a system on a chip (SOC).

In some embodiments, processing circuitry 1470 may include one or more of radio frequency (RF) transceiver circuitry 1472 and baseband processing circuitry 1474. In some embodiments, radio frequency (RF) transceiver circuitry 1472 and baseband processing circuitry 1474 may be on separate chips (or sets of chips), boards, or units, such as radio units and digital units. In alternative embodiments, part or all of RF transceiver circuitry 1472 and baseband processing circuitry 1474 may be on the same chip or set of chips, boards, or units In certain embodiments, some or all of the functionality described herein as being provided by a network node, base station, eNB or other such network device may be performed by processing circuitry 1470 executing instructions stored on device readable medium 1480 or memory within processing circuitry 1470. In alternative embodiments, some or all of the functionality may be provided by processing circuitry 1470 without executing instructions stored on a separate or discrete device readable medium, such as in a hard-wired manner. In any of those embodiments, whether executing instructions stored on a device readable storage medium or not, processing circuitry 1470 can be configured to perform the described functionality. The benefits provided by such functionality are not limited to processing circuitry 1470 alone or to other components of network node 1460, but are enjoyed by network node 1460 as a whole, and/or by end users and the wireless network generally.

Device readable medium 1480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1470. Device readable medium 1480 may store any suitable instructions, data or information, including a computer program, software, an application including one or more of logic, rules, code, tables, etc. and/or other instructions capable of being executed by processing circuitry 1470 and, utilized by network node 1460. Device readable medium 1480 may be used to store any calculations made by processing circuitry 1470 and/or any data received via interface 1490. In some embodiments, processing circuitry 1470 and device readable medium 1480 may be considered to be integrated.

Interface 1490 is used in the wired or wireless communication of signalling and/or data between network node 1460, network 1406, and/or WDs 1410. As illustrated, interface 1490 comprises port(s)/terminal(s) 1494 to send and receive data, for example to and from network 1406 over a wired connection. Interface 1490 also includes radio front end circuitry 1492 that may be coupled to, or in certain embodiments a part of, antenna 1462. Radio front end circuitry 1492 comprises filters 1498 and amplifiers 1496. Radio front end circuitry 1492 may be connected to antenna 1462 and processing circuitry 1470. Radio front end circuitry may be configured to condition signals communicated between antenna 1462 and processing circuitry 1470. Radio front end circuitry 1492 may receive digital data that is to be sent out to other network nodes or WDs via a wireless connection. Radio front end circuitry 1492 may convert the digital data into a radio signal having the appropriate channel and bandwidth parameters using a combination of filters 1498 and/or amplifiers 1496. The radio signal may then be transmitted via antenna 1462. Similarly, when receiving data, antenna 1462 may collect radio signals which are then converted into digital data by radio front end circuitry 1492. The digital data may be passed to processing circuitry 1470. In other embodiments, the interface may comprise different components and/or different combinations of components.

In certain alternative embodiments, network node 1460 may not include separate radio front end circuitry 1492, instead, processing circuitry 1470 may comprise radio front end circuitry and may be connected to antenna 1462 without separate radio front end circuitry 1492. Similarly, in some embodiments, all or some of RF transceiver circuitry 1472 may be considered a part of interface 1490. In still other embodiments, interface 1490 may include one or more ports or terminals 1494, radio front end circuitry 1492, and RF transceiver circuitry 1472, as part of a radio unit (not shown), and interface 1490 may communicate with baseband processing circuitry 1474, which is part of a digital unit (not shown).

Antenna 1462 may include one or more antennas, or antenna arrays, configured to send and/or receive wireless signals. Antenna 1462 may be coupled to radio front end circuitry 1490 and may be any type of antenna capable of transmitting and receiving data and/or signals wirelessly. In some embodiments, antenna 1462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1462 may be separate from network node 1460 and may be connectable to network node 1460 through an interface or port.

Antenna 1462, interface 1490, and/or processing circuitry 1470 may be configured to perform any receiving operations and/or certain obtaining operations described herein as being performed by a network node. Any information, data and/or signals may be received from a wireless device, another network node and/or any other network equipment. Similarly, antenna 1462, interface 1490, and/or processing circuitry 1470 may be configured to perform any transmitting operations described herein as being performed by a network node. Any information, data and/or signals may be transmitted to a wireless device, another network node and/or any other network equipment.

Power circuitry 1487 may comprise, or be coupled to, power management circuitry and is configured to supply the components of network node 1460 with power for performing the functionality described herein. Power circuitry 1487 may receive power from power source 1486. Power source 1486 and/or power circuitry 1487 may be configured to provide power to the various components of network node 1460 in a form suitable for the respective components (e.g., at a voltage and current level needed for each respective component). Power source 1486 may either be included in, or external to, power circuitry 1487 and/or network node 1460. For example, network node 1460 may be connectable to an external power source (e.g., an electricity outlet) via an input circuitry or interface such as an electrical cable, whereby the external power source supplies power to power circuitry 1487. As a further example, power source 1486 may comprise a source of power in the form of a battery or battery pack which is connected to, or integrated in, power circuitry 1487. The battery may provide backup power should the external power source fail. Other types of power sources, such as photovoltaic devices, may also be used.

Alternative embodiments of network node 1460 may include additional components beyond those shown in FIGS. 14A-14B that may be responsible for providing certain aspects of the network node's functionality, including any of the functionality described herein and/or any functionality necessary to support the subject matter described herein. For example, network node 1460 may include user interface equipment to allow input of information into network node 1460 and to allow output of information from network node 1460. This may allow a user to perform diagnostic, maintenance, repair, and other administrative functions for network node 1460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2×) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1410 includes antenna 1411, interface 1414, processing circuitry 1420, device readable medium 1430, user interface equipment 1432, auxiliary equipment 1434, power source 1436 and power circuitry 1437. WD 1410 may include multiple sets of one or more of the illustrated components for different wireless technologies supported by WD 1410, such as, for example, GSM, WCDMA, LTE, NR, WiFi, WiMAX, or Bluetooth wireless technologies, just to mention a few. These wireless technologies may be integrated into the same or different chips or set of chips as other components within WD 1410.

Antenna 1411 may include one or more antennas or antenna arrays, configured to send and/or receive wireless signals, and is connected to interface 1414. In certain alternative embodiments, antenna 1411 may be separate from WD 1410 and be connectable to WD 1410 through an interface or port. Antenna 1411, interface 1414, and/or processing circuitry 1420 may be configured to perform any receiving or transmitting operations described herein as being performed by a WD. Any information, data and/or signals may be received from a network node and/or another WD. In some embodiments, radio front end circuitry and/or antenna 1411 may be considered an interface.

As illustrated, interface 1414 comprises radio front end circuitry 1412 and antenna 1411. Radio front end circuitry 1412 comprise one or more filters 1418 and amplifiers 1416. Radio front end circuitry 1412 is connected to antenna 1411 and processing circuitry 1420 and is configured to condition signals communicated between antenna 1411 and processing circuitry 1420. Radio front end circuitry 1412 may be coupled to or a part of antenna 1411. In some embodiments, WD 1410 may not include separate radio front end circuitry 1412; rather, processing circuitry 1420 may comprise radio front end circuitry and may be connected to antenna 1411. Similarly, in some embodiments, some or all of RF transceiver circuitry 1422 may be considered a part of interface 1414. Radio front end circuitry 1412 may receive digital data that is to be sent out to other network nodes or WDs via a wireless connection. Radio front end circuitry 1412 may convert the digital data into a radio signal having the appropriate channel and bandwidth parameters using a combination of filters 1418 and/or amplifiers 1416. The radio signal may then be transmitted via antenna 1411. Similarly, when receiving data, antenna 1411 may collect radio signals which are then converted into digital data by radio front end circuitry 1412. The digital data may be passed to processing circuitry 1420. In other embodiments, the interface may comprise different components and/or different combinations of components.

Processing circuitry 1420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1410 components, such as device readable medium 1480, WD 1410 functionality. Such functionality may include providing any of the various wireless features or benefits discussed herein. For example, processing circuitry 1420 may execute instructions stored in device readable medium 1480 or in memory within processing circuitry 1420 to provide the functionality disclosed herein.

As illustrated, processing circuitry 1420 includes one or more of RF transceiver circuitry 1422, baseband processing circuitry 1424, and application processing circuitry 1426. In other embodiments, the processing circuitry may comprise different components and/or different combinations of components. In certain embodiments processing circuitry 1420 of WD 1410 may comprise a SOC. In some embodiments, RF transceiver circuitry 1422, baseband processing circuitry 1424, and application processing circuitry 1426 may be on separate chips or sets of chips. In alternative embodiments, part or all of baseband processing circuitry 1424 and application processing circuitry 1426 may be combined into one chip or set of chips, and RF transceiver circuitry 1422 may be on a separate chip or set of chips. In still alternative embodiments, part or all of RF transceiver circuitry 1422 and baseband processing circuitry 1424 may be on the same chip or set of chips, and application processing circuitry 1426 may be on a separate chip or set of chips. In yet other alternative embodiments, part or all of RF transceiver circuitry 1422, baseband processing circuitry 1424, and application processing circuitry 1426 may be combined in the same chip or set of chips. In some embodiments, RF transceiver circuitry 1422 may be a part of interface 1414. RF transceiver circuitry 1422 may condition RF signals for processing circuitry 1420.

In certain embodiments, some or all of the functionality described herein as being performed by a WD may be provided by processing circuitry 1420 executing instructions stored on device readable medium 1480, which in certain embodiments may be a computer-readable storage medium. In alternative embodiments, some or all of the functionality may be provided by processing circuitry 1420 without executing instructions stored on a separate or discrete device readable storage medium, such as in a hard-wired manner. In any of those particular embodiments, whether executing instructions stored on a device readable storage medium or not, processing circuitry 1420 can be configured to perform the described functionality. The benefits provided by such functionality are not limited to processing circuitry 1420 alone or to other components of WD 1410, but are enjoyed by WD 1410 as a whole, and/or by end users and the wireless network generally.

Processing circuitry 1420 may be configured to perform any determining, calculating, or similar operations (e.g., certain obtaining operations) described herein as being performed by a WD. These operations, as performed by processing circuitry 1420, may include processing information obtained by processing circuitry 1420 by, for example, converting the obtained information into other information, comparing the obtained information or converted information to information stored by WD 1410, and/or performing one or more operations based on the obtained information or converted information, and as a result of said processing making a determination.

Device readable medium 1430 may be operable to store a computer program, software, an application including one or more of logic, rules, code, tables, etc. and/or other instructions capable of being executed by processing circuitry 1420. Device readable medium 1430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1420. In some embodiments, processing circuitry 1420 and device readable medium 1430 may be considered to be integrated.

User interface equipment 1432 may provide components that allow for a human user to interact with WD 1410. Such interaction may be of many forms, such as visual, audial, tactile, etc. User interface equipment 1432 may be operable to produce output to the user and to allow the user to provide input to WD 1410. The type of interaction may vary depending on the type of user interface equipment 1432 installed in WD 1410. For example, if WD 1410 is a smart phone, the interaction may be via a touch screen; if WD 1410 is a smart meter, the interaction may be through a screen that provides usage (e.g., the number of gallons used) or a speaker that provides an audible alert (e.g., if smoke is detected). User interface equipment 1432 may include input interfaces, devices and circuits, and output interfaces, devices and circuits. User interface equipment 1432 is configured to allow input of information into WD 1410 and is connected to processing circuitry 1420 to allow processing circuitry 1420 to process the input information. User interface equipment 1432 may include, for example, a microphone, a proximity or other sensor, keys/buttons, a touch display, one or more cameras, a USB port, or other input circuitry. User interface equipment 1432 is also configured to allow output of information from WD 1410, and to allow processing circuitry 1420 to output information from WD 1410. User interface equipment 1432 may include, for example, a speaker, a display, vibrating circuitry, a USB port, a headphone interface, or other output circuitry. Using one or more input and output interfaces, devices, and circuits, of user interface equipment 1432, WD 1410 may communicate with end users and/or the wireless network and allow them to benefit from the functionality described herein.

Auxiliary equipment 1434 is operable to provide more specific functionality which may not be generally performed by WDs. This may comprise specialized sensors for doing measurements for various purposes, interfaces for additional types of communication such as wired communications etc. The inclusion and type of components of auxiliary equipment 1434 may vary depending on the embodiment and/or scenario.

Power source 1436 may, in some embodiments, be in the form of a battery or battery pack. Other types of power sources, such as an external power source (e.g., an electricity outlet), photovoltaic devices or power cells, may also be used. WD 1410 may further comprise power circuitry 1437 for delivering power from power source 1436 to the various parts of WD 1410 which need power from power source 1436 to carry out any functionality described or indicated herein. Power circuitry 1437 may in certain embodiments comprise power management circuitry. Power circuitry 1437 may additionally or alternatively be operable to receive power from an external power source; in which case WD 1410 may be connectable to the external power source (such as an electricity outlet) via input circuitry or an interface such as an electrical power cable. Power circuitry 1437 may also in certain embodiments be operable to deliver power from an external power source to power source 1436. This may be, for example, for the charging of power source 1436. Power circuitry 1437 may perform any formatting, converting, or other modification to the power from power source 1436 to make the power suitable for the respective components of WD 1410 to which power is supplied.

Figure 15:
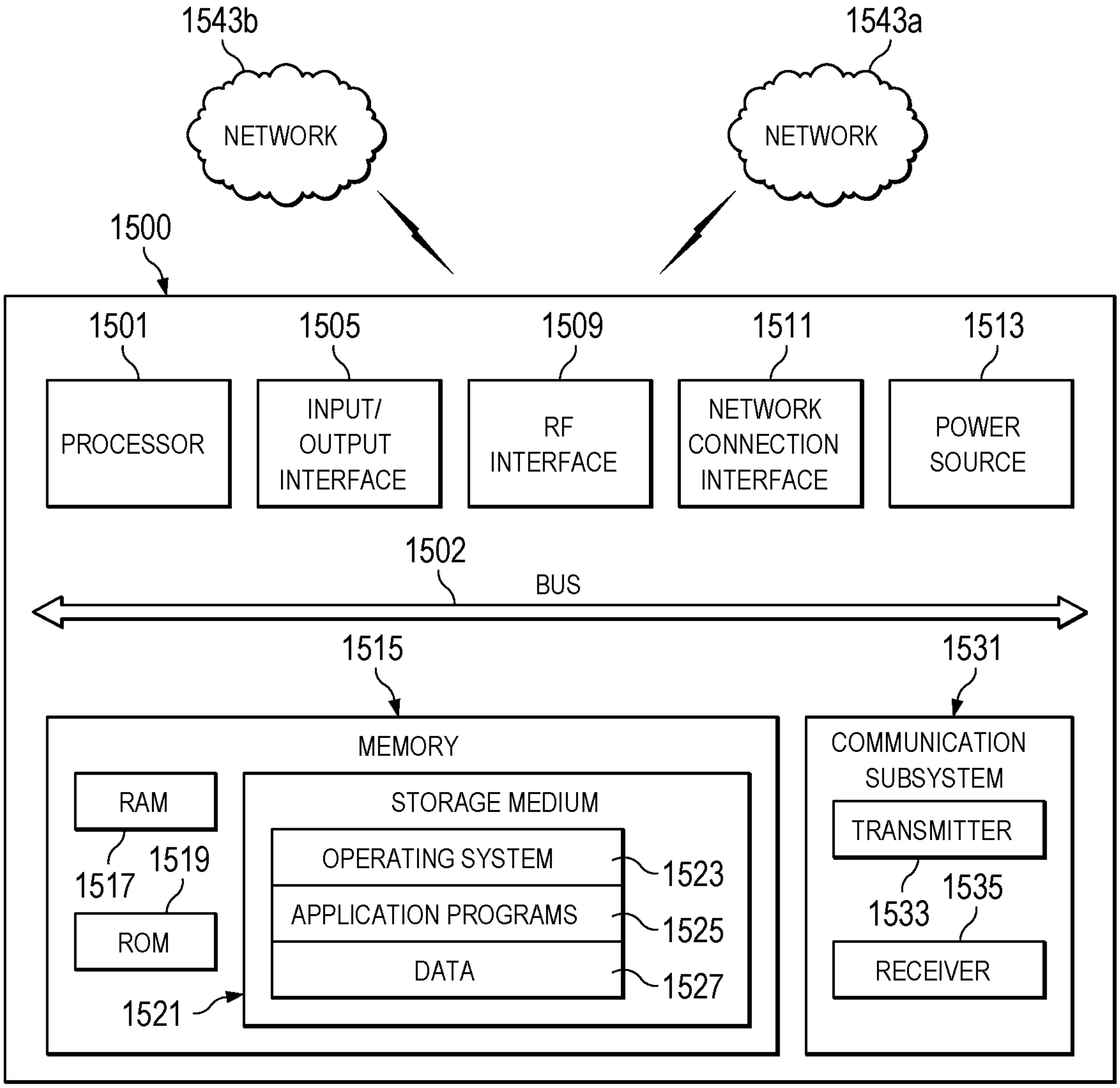
FIG. 15 is an illustration of a User Equipment (e.g., MS, wireless device) configured in accordance with an embodiment of the present disclosure.

FIG. 15 illustrates one embodiment of a UE 1500 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1500 may be any UE identified by the 3$^{rd}$ Generation Partnership Project (3GPP), including a NB-IoT UE, a machine type communication (MTC) UE, and/or an enhanced MTC (eMTC) UE. UE 1500, as illustrated in FIG. 15, is one example of a WD configured for communication in accordance with one or more communication standards promulgated by the 3$^{rd}$ Generation Partnership Project (3GPP), such as 3GPP's GSM, UNITS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 1500 includes processing circuitry 1501 that is operatively coupled to input/output interface 1505, radio frequency (RF) interface 15015, network connection interface 1511, memory 1515 including random access memory (RAM) 1517, read-only memory (ROM) 1519, and storage medium 1521 or the like, communication subsystem 1531, power source 1533, and/or any other component, or any combination thereof. Storage medium 1521 includes operating system 1523, application program 1525, and data 1527. In other embodiments, storage medium 1521 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 1501 may be configured to process computer instructions and data. Processing circuitry 1501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1501 may include two central processing units (CPUs). Data may be information in a form suitable for use by a computer.

In the depicted embodiment, input/output interface 1505 may be configured to provide a communication interface to an input device, output device, or input and output device. UE 1500 may be configured to use an output device via input/output interface 1505. An output device may use the same type of interface port as an input device. For example, a USB port may be used to provide input to and output from UE 1500. The output device may be a speaker, a sound card, a video card, a display, a monitor, a printer, an actuator, an emitter, a smartcard, another output device, or any combination thereof. UE 1500 may be configured to use an input device via input/output interface 1505 to allow a user to capture information into UE 1500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 1509 may be configured to provide a communication interface to RF components such as a transmitter, a receiver, and an antenna. Network connection interface 1511 may be configured to provide a communication interface to network **1543*a*. Network 1543*a* may encompass wired and/or wireless networks such as a local-area network (LAN), a wide-area network (WAN), a computer network, a wireless network, a telecommunications network, another like network or any combination thereof. For example, network 1543*a* may comprise a Wi-Fi network. Network connection interface 1511 may be configured to include a receiver and a transmitter interface used to communicate with one or more other devices over a communication network according to one or more communication protocols, such as Ethernet, TCP/IP, SONET, ATM, or the like. Network connection interface 1511** may implement receiver and transmitter functionality appropriate to the communication network links (e.g., optical, electrical, and the like). The transmitter and receiver functions may share circuit components, software or firmware, or alternatively may be implemented separately.

RAM 1517 may be configured to interface via bus 1502 to processing circuitry 1501 to provide storage or caching of data or computer instructions during the execution of software programs such as the operating system, application programs, and device drivers. ROM 1519 may be configured to provide computer instructions or data to processing circuitry 1501. For example, ROM 1519 may be configured to store invariant low-level system code or data for basic system functions such as basic input and output (I/O), startup, or reception of keystrokes from a keyboard that are stored in a non-volatile memory. Storage medium 1521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1521 may be configured to include operating system 1523, application program 1525 such as a web browser application, a widget or gadget engine or another application, and data file 1527. Storage medium 1521 may store, for use by UE 1500, any of a variety of various operating systems or combinations of operating systems.

Storage medium 1521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1521 may allow UE 1500 to access computer-executable instructions, application programs or the like, stored on transitory or non-transitory memory media, to offload data, or to upload data. An article of manufacture, such as one utilizing a communication system may be tangibly embodied in storage medium 1521, which may comprise a device readable medium.

In FIG. 15, processing circuitry 1501 may be configured to communicate with network **1543*b* using communication subsystem 1531. Network 1543*a* and network 1543*b* may be the same network or networks or different network or networks. Communication subsystem 1531 may be configured to include one or more transceivers used to communicate with network 1543*b*. For example, communication subsystem 1531 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 1533 and/or receiver 1535 to implement transmitter or receiver functionality, respectively, appropriate to the RAN links (e.g., frequency allocations and the like). Further, transmitter 1533 and receiver 1535** of each transceiver may share circuit components, software or firmware, or alternatively may be implemented separately.

In the illustrated embodiment, the communication functions of communication subsystem 1531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1531 may include cellular communication, Wi-Fi communication, Bluetooth communication, and GPS communication. Network **1543*b* may encompass wired and/or wireless networks such as a local-area network (LAN), a wide-area network (WAN), a computer network, a wireless network, a telecommunications network, another like network or any combination thereof. For example, network 1543*b* may be a cellular network, a Wi-Fi network, and/or a near-field network. Power source 1513 may be configured to provide alternating current (AC) or direct current (DC) power to components of UE 1500**.

The features, benefits and/or functions described herein may be implemented in one of the components of UE 1500 or partitioned across multiple components of UE 1500. Further, the features, benefits, and/or functions described herein may be implemented in any combination of hardware, software or firmware. In one example, communication subsystem 1531 may be configured to include any of the components described herein. Further, processing circuitry 1501 may be configured to communicate with any of such components over bus 1502. In another example, any of such components may be represented by program instructions stored in memory that when executed by processing circuitry 1501 perform the corresponding functions described herein. In another example, the functionality of any of such components may be partitioned between processing circuitry 1501 and communication subsystem 1531. In another example, the non-computationally intensive functions of any of such components may be implemented in software or firmware and the computationally intensive functions may be implemented in hardware.

Figure 16:
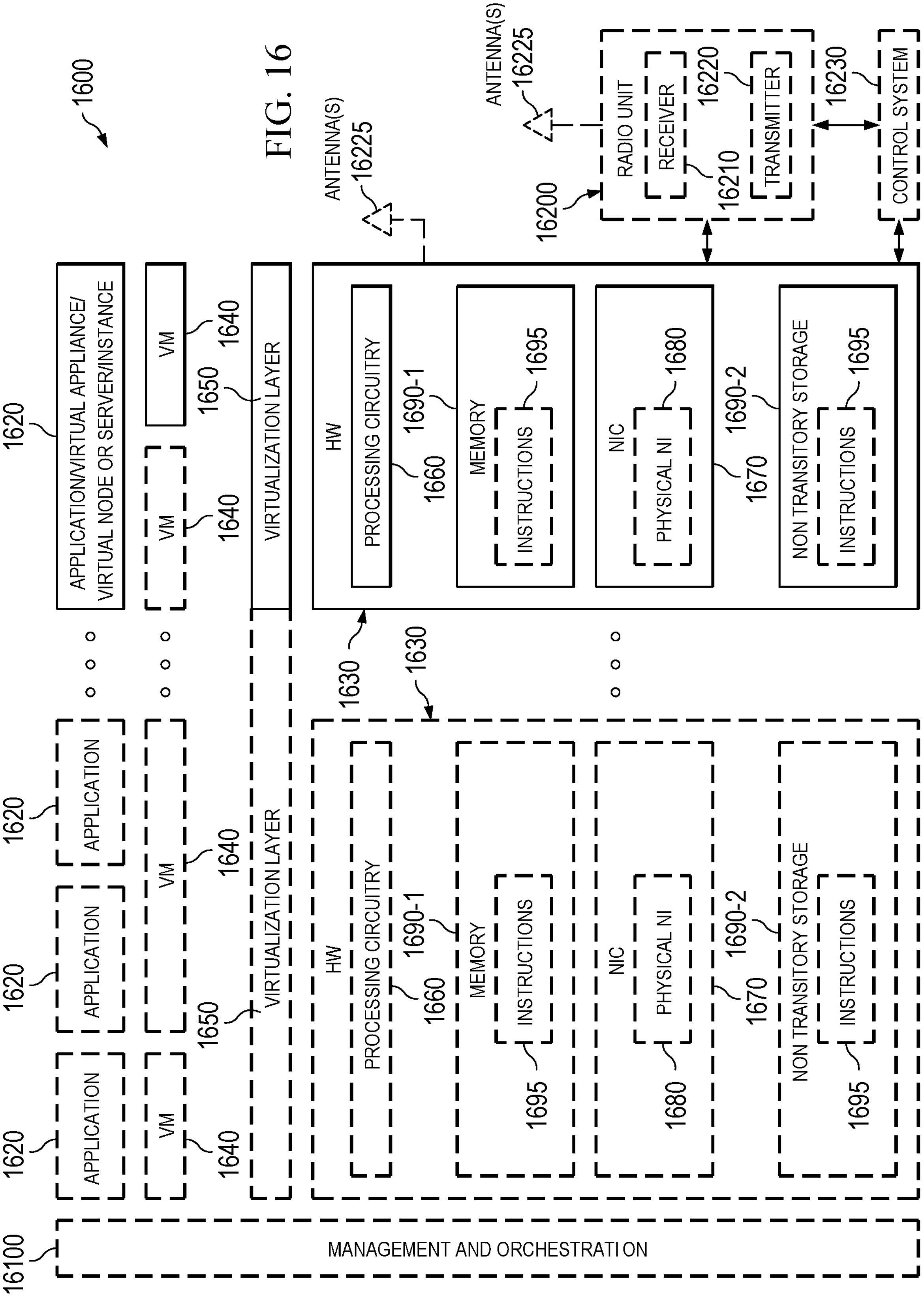
FIG. 16 is an illustration of a virtualization environment in accordance with some embodiments of the present disclosure.

FIG. 16 is a schematic block diagram illustrating a virtualization environment 1600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1600 hosted by one or more of hardware nodes 1630. Further, in embodiments in which the virtual node is not a radio access node or does not require radio connectivity (e.g., a core network node), then the network node may be entirely virtualized.

The functions may be implemented by one or more applications 1620 (which may alternatively be called software instances, virtual appliances, network functions, virtual nodes, virtual network functions, etc.) operative to implement some of the features, functions, and/or benefits of some of the embodiments disclosed herein. Applications 1620 are run in virtualization environment 1600 which provides hardware 1630 comprising processing circuitry 1660 and memory 1690. Memory 1690 contains instructions 1695 executable by processing circuitry 1660 whereby application 1620 is operative to provide one or more of the features, benefits, and/or functions disclosed herein.

Virtualization environment 1600, comprises general-purpose or special-purpose network hardware devices 1630 comprising a set of one or more processors or processing circuitry 1660, which may be commercial off-the-shelf (COTS) processors, dedicated Application Specific Integrated Circuits (ASICs), or any other type of processing circuitry including digital or analog hardware components or special purpose processors. Each hardware device may comprise memory 1690-1 which may be non-persistent memory for temporarily storing instructions 1695 or software executed by processing circuitry 1660. Each hardware device may comprise one or more network interface controllers (NICs) 1670, also known as network interface cards, which include physical network interface 1680. Each hardware device may also include non-transitory, persistent, machine-readable storage media 1690-2 having stored therein software 1695 and/or instructions executable by processing circuitry 1660. Software 1695 may include any type of software including software for instantiating one or more virtualization layers 1650 (also referred to as hypervisors), software to execute virtual machines 1640 as well as software allowing it to execute functions, features and/or benefits described in relation with some embodiments described herein.

Virtual machines 1640, comprise virtual processing, virtual memory, virtual networking or interface and virtual storage, and may be run by a corresponding virtualization layer 1650 or hypervisor. Different embodiments of the instance of virtual appliance 1620 may be implemented on one or more of virtual machines 1640, and the implementations may be made in different ways.

During operation, processing circuitry 1660 executes software 1695 to instantiate the hypervisor or virtualization layer 1650, which may sometimes be referred to as a virtual machine monitor (VMM). Virtualization layer 1650 may present a virtual operating platform that appears like networking hardware to virtual machine 1640.

As shown in FIG. 16, hardware 1630 may be a standalone network node with generic or specific components. Hardware 1630 may comprise antenna 16225 and may implement some functions via virtualization. Alternatively, hardware 1630 may be part of a larger cluster of hardware (e.g. such as in a data center or customer premise equipment (CPE)) where many hardware nodes work together and are managed via management and orchestration (MANO) 16100, which, among others, oversees lifecycle management of applications 1620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1640 may be a software implementation of a physical machine that runs programs as if they were executing on a physical, non-virtualized machine. Each of virtual machines 1640, and that part of hardware 1630 that executes that virtual machine, be it hardware dedicated to that virtual machine and/or hardware shared by that virtual machine with others of the virtual machines 1640, forms a separate virtual network elements (VNE).

Still in the context of NFV, Virtual Network Function (VNF) is responsible for handling specific network functions that run in one or more virtual machines 1640 on top of hardware networking infrastructure 530 and corresponds to application 1620 in FIG. 16.

In some embodiments, one or more radio units 16200 that each include one or more transmitters 16220 and one or more receivers 16210 may be coupled to one or more antennas 16225. Radio units 16200 may communicate directly with hardware nodes 1630 via one or more appropriate network interfaces and may be used in combination with the virtual components to provide a virtual node with radio capabilities, such as a radio access node or a base station.

In some embodiments, some signalling can be affected with the use of control system 16230 which may alternatively be used for communication between the hardware nodes 1630 and radio units 16200.

Figure 17:
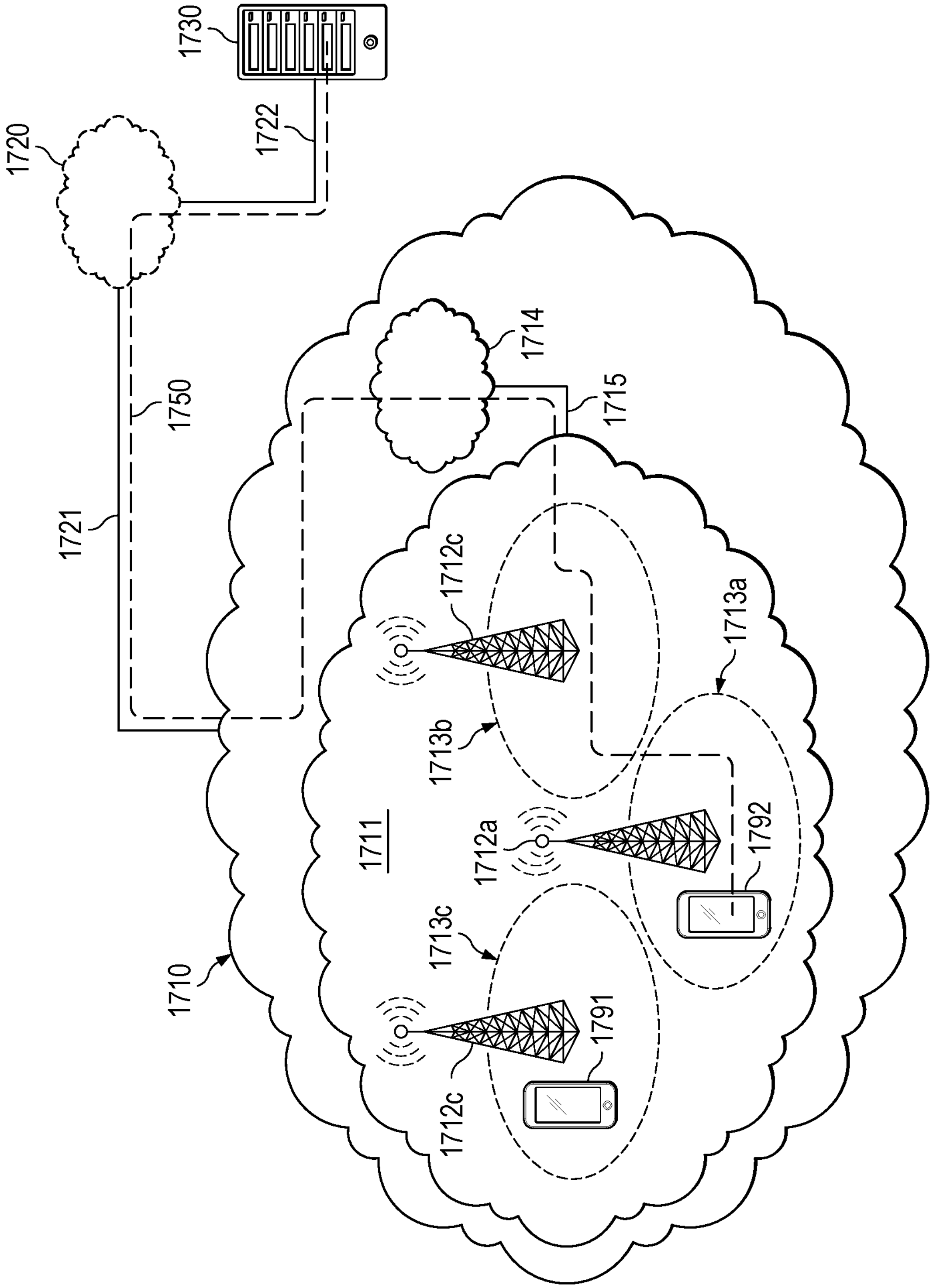
FIG. 17 is an illustration of a telecommunication network connected via an intermediate network to a host computer in accordance with some embodiments of the present disclosure.

With reference to FIG. 17, in accordance with an embodiment, a communication system includes telecommunication network 1710, such as a 3GPP-type cellular network, which comprises access network 1711, such as a radio access network, and core network 1714. Access network 1711 comprises a plurality of base stations 1712*a*, 1712*b*, 1712*c*, such as NBs, eNBs, gNBs or other types of wireless access points, each defining a corresponding coverage area 1713*a*, 1713*b*, 1713*c*. Each base station 1712*a*, 1712*b*, 1712*c* is connectable to core network 1714 over a wired or wireless connection 1715. A first UE 1791 located in coverage area 1713*c* is configured to wirelessly connect to, or be paged by, the corresponding base station 1712*c*. A second UE 1792 in coverage area 1713*a* is wirelessly connectable to the corresponding base station 1712*a*. While a plurality of UEs 1791, 1792 are illustrated in this example, the disclosed embodiments are equally applicable to a situation where a sole UE is in the coverage area or where a sole UE is connecting to the corresponding base station 1712.

Telecommunication network 1710 is itself connected to host computer 1730, which may be embodied in the hardware and/or software of a standalone server, a cloud-implemented server, a distributed server or as processing resources in a server farm. Host computer 1730 may be under the ownership or control of a service provider, or may be operated by the service provider or on behalf of the service provider. Connections 1721 and 1722 between telecommunication network 1710 and host computer 1730 may extend directly from core network 1714 to host computer 1730 or may go via an optional intermediate network 1720. Intermediate network 1720 may be one of, or a combination of more than one of, a public, private or hosted network; intermediate network 1720, if any, may be a backbone network or the Internet; in particular, intermediate network 1720 may comprise two or more sub-networks (not shown).

The communication system of FIG. 17 as a whole enables connectivity between the connected UEs 1791, 1792 and host computer 1730. The connectivity may be described as an over-the-top (OTT) connection 1750. Host computer 1730 and the connected UEs 1791, 1792 are configured to communicate data and/or signaling via OTT connection 1750, using access network 1711, core network 1714, any intermediate network 1720 and possible further infrastructure (not shown) as intermediaries. OTT connection 1750 may be transparent in the sense that the participating communication devices through which OTT connection 1750 passes are unaware of routing of uplink and downlink communications. For example, base station 1712 may not or need not be informed about the past routing of an incoming downlink communication with data originating from host computer 1730 to be forwarded (e.g., handed over) to a connected UE 1791. Similarly, base station 1712 need not be aware of the future routing of an outgoing uplink communication originating from the UE 1791 towards the host computer 1730.

Example implementations, in accordance with an embodiment, of the UE, base station and host computer discussed in the preceding paragraphs will now be described with reference to FIG. 18. In communication system 1800, host computer 1810 comprises hardware 1815 including communication interface 1816 configured to set up and maintain a wired or wireless connection with an interface of a different communication device of communication system 1800. Host computer 1810 further comprises processing circuitry 1818, which may have storage and/or processing capabilities. In particular, processing circuitry 1818 may comprise one or more programmable processors, application-specific integrated circuits, field programmable gate arrays or combinations of these (not shown) adapted to execute instructions. Host computer 1810 further comprises software 1811, which is stored in or accessible by host computer 1810 and executable by processing circuitry 1818. Software 1811 includes host application 1812. Host application 1812 may be operable to provide a service to a remote user, such as UE 1830 connecting via OTT connection 1850 terminating at UE 1830 and host computer 1810. In providing the service to the remote user, host application 1812 may provide user data which is transmitted using OTT connection 1850.

Communication system 1800 further includes base station 1820 provided in a telecommunication system and comprising hardware 1825 enabling it to communicate with host computer 1810 and with UE 1830. Hardware 1825 may include communication interface 1826 for setting up and maintaining a wired or wireless connection with an interface of a different communication device of communication system 1800, as well as radio interface 1827 for setting up and maintaining at least wireless connection 1870 with UE 1830 located in a coverage area (not shown in FIG. 18) served by base station 1820. Communication interface 1826 may be configured to facilitate connection 1860 to host computer 1810. Connection 1860 may be direct or it may pass through a core network (not shown in FIG. 18) of the telecommunication system and/or through one or more intermediate networks outside the telecommunication system. In the embodiment shown, hardware 1825 of base station 1820 further includes processing circuitry 1828, which may comprise one or more programmable processors, application-specific integrated circuits, field programmable gate arrays or combinations of these (not shown) adapted to execute instructions. Base station 1820 further has software 1821 stored internally or accessible via an external connection.

Communication system 1800 further includes UE 1830 already referred to. Its hardware 1835 may include radio interface 1837 configured to set up and maintain wireless connection 1870 with a base station serving a coverage area in which UE 1830 is currently located. Hardware 1835 of UE 1830 further includes processing circuitry 1838, which may comprise one or more programmable processors, application-specific integrated circuits, field programmable gate arrays or combinations of these (not shown) adapted to execute instructions. UE 1830 further comprises software 1831, which is stored in or accessible by UE 1830 and executable by processing circuitry 1838. Software 1831 includes client application 1832. Client application 1832 may be operable to provide a service to a human or non-human user via UE 1830, with the support of host computer 1810. In host computer 1810, an executing host application 1812 may communicate with the executing client application 1832 via OTT connection 1850 terminating at UE 1830 and host computer 1810. In providing the service to the user, client application 1832 may receive request data from host application 1812 and provide user data in response to the request data. OTT connection 1850 may transfer both the request data and the user data. Client application 1832 may interact with the user to generate the user data that it provides.

Figure 18:
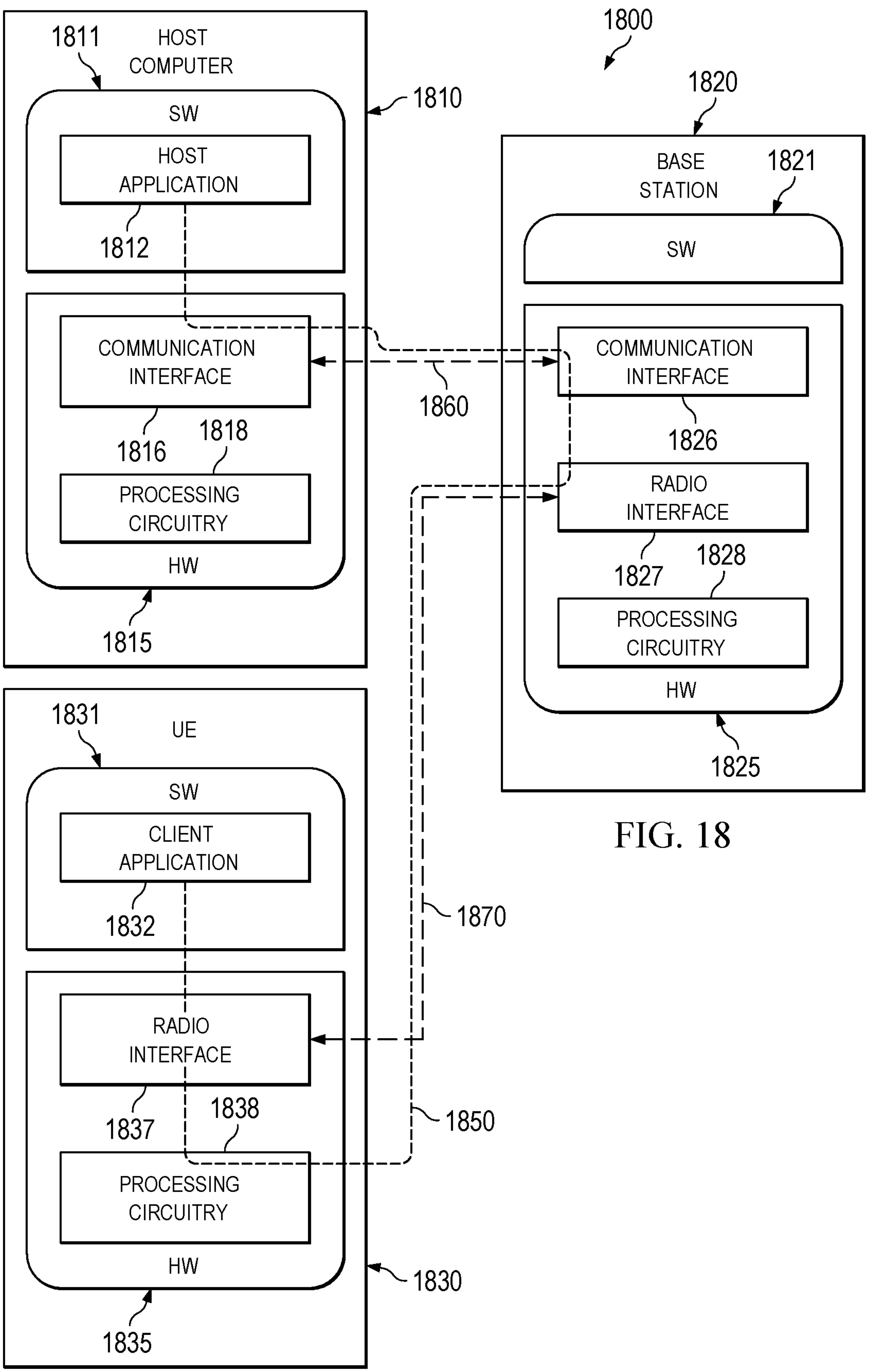
FIG. 18 is an illustration of a host computer communicating via a base station with a user equipment over a partially wireless connection in accordance with some embodiments of the present disclosure.

It is noted that host computer 1810, base station 1820 and UE 1830 illustrated in FIG. 18 may be similar or identical to host computer 1730, one of base stations 1712*a*, 1712*b*, 1712*c* and one of UEs 1791, 1792 of FIG. 17, respectively. This is to say, the inner workings of these entities may be as shown in FIG. 18 and independently, the surrounding network topology may be that of FIG. 17.

In FIG. 18, OTT connection 1850 has been drawn abstractly to illustrate the communication between host computer 1810 and UE 1830 via base station 1820, without explicit reference to any intermediary devices and the precise routing of messages via these devices. Network infrastructure may determine the routing, which it may be configured to hide from UE 1830 or from the service provider operating host computer 1810, or both. While OTT connection 1850 is active, the network infrastructure may further take decisions by which it dynamically changes the routing (e.g., on the basis of load balancing consideration or reconfiguration of the network).

Wireless connection 1870 between UE 1830 and base station 1820 is in accordance with the teachings of the embodiments described throughout this disclosure. One or more of the various embodiments improve the performance of OTT services provided to UE 1830 using OTT connection 1850, in which wireless connection 1870 forms the last segment. More precisely, the teachings of these embodiments may improve the security in accurate position estimation of the UE 1830 and thereby provide benefits such as increasing security to a user's applications and data; reducing uplink latency which makes a vehicular communication service safer; and conserving uplink transmit energy which extends the lifetime of battery-powered sensors and meters.

A measurement procedure may be provided for the purpose of monitoring data rate, latency and other factors on which the one or more embodiments improve. There may further be an optional network functionality for reconfiguring OTT connection 1850 between host computer 1810 and UE 1830, in response to variations in the measurement results. The measurement procedure and/or the network functionality for reconfiguring OTT connection 1850 may be implemented in software 1811 and hardware 1815 of host computer 1810 or in software 1831 and hardware 1835 of UE 1830, or both. In embodiments, sensors (not shown) may be deployed in or in association with communication devices through which OTT connection 1850 passes; the sensors may participate in the measurement procedure by supplying values of the monitored quantities exemplified above, or supplying values of other physical quantities from which software 1811, 1831 may compute or estimate the monitored quantities. The reconfiguring of OTT connection 1850 may include message format, retransmission settings, preferred routing etc.; the reconfiguring need not affect base station 1820, and it may be unknown or imperceptible to base station 1820. Such procedures and functionalities may be known and practiced in the art. In certain embodiments, measurements may involve proprietary UE signaling facilitating host computer 1810's measurements of throughput, propagation times, latency and the like. The measurements may be implemented in that software 1811 and 1831 causes messages to be transmitted, in particular empty or 'dummy' messages, using OTT connection 1850 while it monitors propagation times, errors etc.

Figure 19:
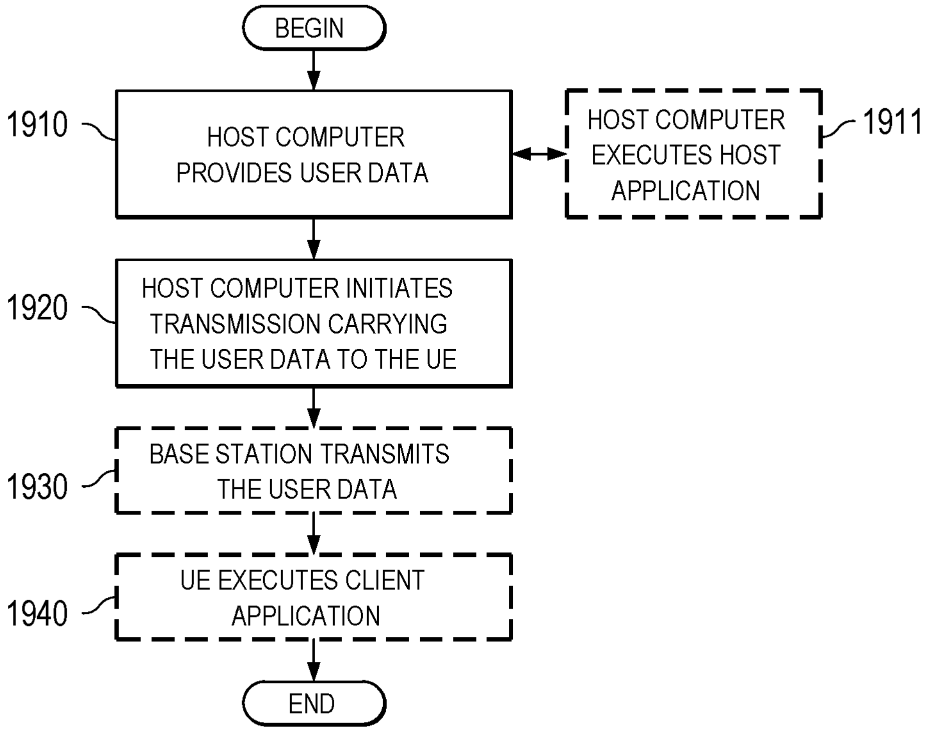
FIG. 19 is an illustration of methods implemented in a communication system including a host computer, a base station and a user equipment in accordance with some embodiments of the present disclosure.

FIG. 19 is a flowchart illustrating a method implemented in a communication system, in accordance with one embodiment. The communication system includes a host computer, a base station and a UE which may be those described with reference to FIGS. 14-18. For simplicity of the present disclosure, only drawing references to FIG. 19 will be included in this section. In step 1910, the host computer provides user data. In substep 1911 (which may be optional) of step 1910, the host computer provides the user data by executing a host application. In step 1920, the host computer initiates a transmission carrying the user data to the UE. In step 1930 (which may be optional), the base station transmits to the UE the user data which was carried in the transmission that the host computer initiated, in accordance with the teachings of the embodiments described throughout this disclosure. In step 1940 (which may also be optional), the UE executes a client application associated with the host application executed by the host computer.

Figure 20:
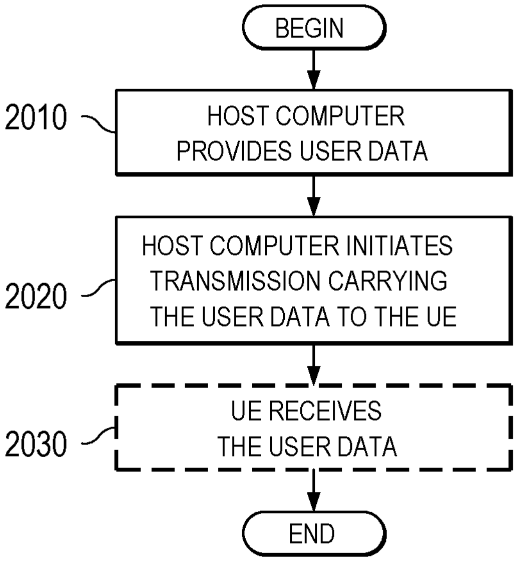
FIG. 20 is an illustration of methods implemented in a communication system including a host computer, a base station and a user equipment in accordance with some embodiments of the present disclosure.

FIG. 20 is a flowchart illustrating a method implemented in a communication system, in accordance with one embodiment. The communication system includes a host computer, a base station and a UE which may be those described with reference to FIGS. 14-18. For simplicity of the present disclosure, only drawing references to FIG. 20 will be included in this section. In step 2010 of the method, the host computer provides user data. In an optional substep (not shown) the host computer provides the user data by executing a host application. In step 2020, the host computer initiates a transmission carrying the user data to the UE. The transmission may pass via the base station, in accordance with the teachings of the embodiments described throughout this disclosure. In step 2030 (which may be optional), the UE receives the user data carried in the transmission.

Figure 21:
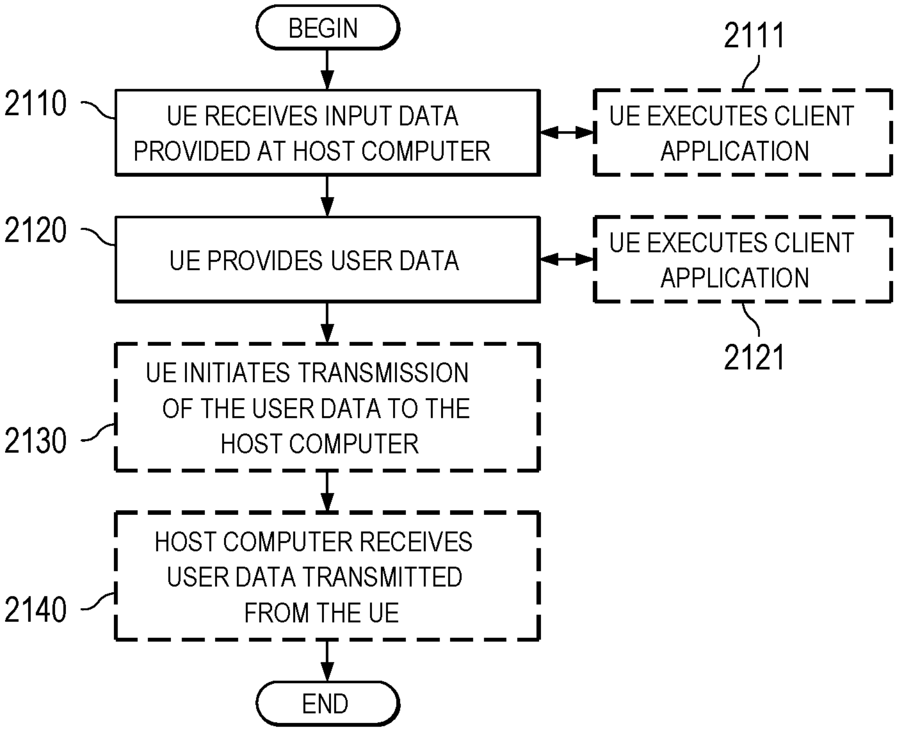
FIG. 21 is an illustration of methods implemented in a communication system including a host computer, a base station and a user equipment in accordance with some embodiments of the present disclosure; and, FIG. 22 is an illustration of methods implemented in a communication system including a host computer, a base station and a user equipment in accordance with some embodiments of the present disclosure.

FIG. 21 is a flowchart illustrating a method implemented in a communication system, in accordance with one embodiment. The communication system includes a host computer, a base station and a UE which may be those described with reference to FIGS. 14-18. For simplicity of the present disclosure, only drawing references to FIG. 21 will be included in this section. In step 2110 (which may be optional), the UE receives input data provided by the host computer. Additionally or alternatively, in step 2120, the UE provides user data. In substep 2121 (which may be optional) of step 2120, the UE provides the user data by executing a client application. In substep 2111 (which may be optional) of step 2110, the UE executes a client application which provides the user data in reaction to the received input data provided by the host computer. In providing the user data, the executed client application may further consider user input received from the user. Regardless of the specific manner in which the user data was provided, the UE initiates, in substep 2130 (which may be optional), transmission of the user data to the host computer. In step 2140 of the method, the host computer receives the user data transmitted from the UE, in accordance with the teachings of the embodiments described throughout this disclosure.

Figure 22:
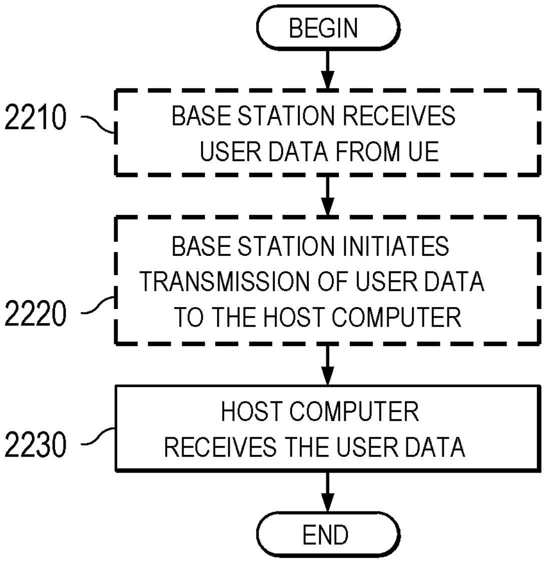

FIG. 22 is a flowchart illustrating a method implemented in a communication system, in accordance with one embodiment. The communication system includes a host computer, a base station and a UE which may be those described with reference to FIGS. 14-18. For simplicity of the present disclosure, only drawing references to FIG. 22 will be included in this section. In step 2210 (which may be optional), in accordance with the teachings of the embodiments described throughout this disclosure, the base station receives user data from the UE. In step 2220 (which may be optional), the base station initiates transmission of the received user data to the host computer. In step 2230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Exemplary Embodiments

Group A Embodiments

1. A method performed by a 4G network node which interacts with a terminal node and a 5G network node, the method comprising:

receiving, from the terminal node, a B1 measurement report which references a 5G New Radio (NR) cell;

receiving at least one of the following: (1) a predetermined number of consecutive SgNB addition request rejections associated with the 5G NR cell; or (2) a predetermined number of consecutive SCG failures associated with the 5G NR cell; and, upon receiving the predetermined number of consecutive SgNB addition request rejections associated with the 5G NR cell or the predetermined number of consecutive SCG failures associated with the 5G NR cell, transmitting to the terminal node a Radio Resource Control (RRC) reconfiguration message having at least two parameters: (1) an offset value to be associated with the 5G NR cell, and (2) a timer value indicating a period of time where the terminal node will not reference the 5G NR cell in a new B1 measurement report.

2. The method of embodiment 1, wherein:
the SgNB addition request rejections are received from the 5G network node in SgNBAdditionRequestReject messages; and,
the SCG failures are received from the terminal node in RRC SCG Failure Indication messages.

3. The method of embodiment 1, wherein:
the offset value has a value of infinity; and,
the timer value has a range: {0 . . . 100}, a unit: seconds, and utilizes 7 bits.

4. The method of embodiment 1, wherein:
the terminal node is an E-UTRA-NR Dual Connectivity (EN-DC) User Equipment (UE);
the 4G network node is a Master eNodeB (MeNB); and,
the 5G network node is a SgNB.

Group B Embodiments

5. A method performed by a terminal node which interacts with a 4G network node, the method comprising:
transmitting, to the 4G network node, a B1 measurement report which references a 5G New Radio (NR) cell; and,
receiving, from the 4G network node, a Radio Resource Control (RRC) reconfiguration message having at least two parameters: (1) an offset value associated with the 5G NR cell that has been associated with a predetermined number of consecutive SgNB addition request rejections or a predetermined number of consecutive SCG failures; and (2) a timer value indicating a period of time where the terminal node will not reference the 5G NR cell in a new B1 measurement report.

6. The method of embodiment 5, further comprising:
starting the timer; and
adding, the offset value to a Reference Signal Received Power (RSRP) of the 5G NR cell, wherein the offset value is set such that the UE would not report the 5G NR cell in the new B1 measurement report while the timer is running.

7. The method of embodiment 6, further comprising:
determining whether or not the timer has expired;
based on the determination that the timer has expired, removing the offset value from the RSRP of the 5G NR cell which permits the 5G NR cell to be added in the new B1 measurement report transmitted to the 4G network node;
based on the determination that the timer has not expired, determining whether another 5G NR cell has a RSRP satisfying a B1 report threshold;
based on the determination that another 5G NR cell has the RSRP satisfying the B1 report threshold, transmit the new B1 measurement report which references the another 5G NR cell to the 4G network node; and
based on the determination that another 5G NR cell does not have the RSRP satisfying the B1 report threshold, waiting for the timer to expire and then return to the step of determining whether or not the timer has expired.

8. The method of embodiment 5, wherein:
the terminal node is an E-UTRA-NR Dual Connectivity (EN-DC) User Equipment (UE); and,
the 4G network node is a Master eNodeB (MeNB).

9. The method of embodiment 5, wherein:
the offset value has a value of infinity; and,
the timer value has a range: {0 . . . 100}, a unit: seconds, and utilizes 7 bits.

Group C Embodiments

10. A network node comprising:
processing circuitry configured to perform any of the steps of any of the Group A embodiments; and
power supply circuitry configured to supply power to the network node.

11. A terminal node comprising:
processing circuitry configured to perform any of the steps of any of the Group B embodiments;
power supply circuitry configured to supply power to the terminal node.

12. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group B embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

13. A communication system including a host computer comprising:
processing circuitry configured to provide user data; and
a communication interface configured to forward the user data to a cellular network for transmission to a user equipment (UE),
wherein the cellular network comprises a network node having a radio interface and processing circuitry, the network node's processing circuitry configured to perform any of the steps of any of the Group A embodiments.

14. The communication system of the pervious embodiment further including the network node.

15. The communication system of the previous 2 embodiments, further including the UE, wherein the UE is configured to communicate with the network node.

16. The communication system of the previous 3 embodiments, wherein:
the processing circuitry of the host computer is configured to execute a host application, thereby providing the user data; and
the UE comprises processing circuitry configured to execute a client application associated with the host application.

17. A method implemented in a communication system including a host computer, a network node and a user equipment (UE), the method comprising:
at the host computer, providing user data; and
at the host computer, initiating a transmission carrying the user data to the UE via a cellular network comprising the base station, wherein the network node performs any of the steps of any of the Group A embodiments.

18. The method of the previous embodiment, further comprising, at the network node, transmitting the user data.

19. The method of the previous 2 embodiments, wherein the user data is provided at the host computer by executing a host application, the method further comprising, at the UE, executing a client application associated with the host application.

20. A user equipment (UE) configured to communicate with a network node, the UE comprising a radio interface and processing circuitry configured to performs anyone of the previous 3 embodiments.

21. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group B embodiments.

22. The communication system of the previous embodiment, wherein the cellular network further includes a network node configured to communicate with the UE.

23. The communication system of the previous 2 embodiments, wherein:

the processing circuitry of the host computer is configured to execute a host application, thereby providing the user data; and the UE's processing circuitry is configured to execute a client application associated with the host application.

24. A method implemented in a communication system including a host computer, a network node and a user equipment (UE), the method comprising:

at the host computer, providing user data; and at the host computer, initiating a transmission carrying the user data to the UE via a cellular network comprising the base station, wherein the UE performs any of the steps of any of the Group B embodiments.

The method of the previous embodiment, further comprising at the UE, receiving the user data from the network node.

26. A communication system including a host computer comprising:

communication interface configured to receive user data originating from a transmission from a user equipment (UE) to a network node, wherein the UE comprises a radio interface and processing circuitry, the UE's processing circuitry configured to perform any of the steps of any of the Group B embodiments.

27. The communication system of the previous embodiment, further including the UE.

28. The communication system of the previous 2 embodiments, further including the network node, wherein the network node comprises a radio interface configured to communicate with the UE and a communication interface configured to forward to the host computer the user data carried by a transmission from the UE to the network node.

29. The communication system of the previous 3 embodiments, wherein:

the processing circuitry of the host computer is configured to execute a host application; and the UE's processing circuitry is configured to execute a client application associated with the host application, thereby providing the user data.

30. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

31. A method implemented in a communication system including a host computer, a network node and a user equipment (UE), the method comprising:

at the host computer, receiving user data transmitted to the base station from the UE, wherein the UE performs any of the steps of any of the Group B embodiments.

32. The method of the previous embodiment, further comprising, at the UE, providing the user data to the network node.

33. The method of the previous 2 embodiments, further comprising:

at the UE, executing a client application, thereby providing the user data to be transmitted; and at the host computer, executing a host application associated with the client application.

34. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

35. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group A embodiments.

36. The communication system of the previous embodiment further including the network node.

37. The communication system of the previous 2 embodiments, further including the UE, wherein the UE is configured to communicate with the network node.

38. The communication system of the previous 3 embodiments, wherein:

the processing circuitry of the host computer is configured to execute a host application;

the UE is configured to execute a client application associated with the host application, thereby providing the user data to be received by the host computer.

39. A method implemented in a communication system including a host computer, a network node and a user equipment (UE), the method comprising:

at the host computer, receiving, from the network node, user data originating from a transmission which the base station has received from the UE, wherein the UE performs any of the steps of any of the Group B embodiments.

40. The method of the previous embodiment, further comprising at the base station, receiving the user data from the UE.

41. The method of the previous 2 embodiments, further comprising at the network node, initiating a transmission of the received user data to the host computer.

REFERENCES 1. 3GPP TS 37.340 V15.9.0 (2020-07).
2. 3GPP TS 36.331 V16.0.0 (2020-03).

3. 3GPP TS 36.423 V15.10.0 (2020-07).

4. 3GPP TS 38.331 V15.10.0 (2020-07).

Note: The contents of these references are hereby incorporated herein for all purposes.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ACLR Adjacent Channel Leakage Ratio
ARQ Automatic Repeat Request
AWGN Additive White Gaussian Noise
BCCH Broadcast Control Channel
BCH Broadcast Channel
BTS Base Transceiver Station
BSS Base Station Subsystem
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell Radio Network Temporary Identifier
CSG Closed Subscriber Group
CSI Channel State Information
DCCH Dedicated Control Channel
DL Downlink
DM Demodulation
DMRS Demodulation Reference Signal
DRB Data Radio Bearer
DRX Discontinuous Reception
DTX Discontinuous Transmission
DTCH Dedicated Traffic Channel
DUT Device Under Test
E-CID Enhanced Cell-ID (positioning method)
ECGI Evolved CGI
EC-GSM-IoT Extended Coverage GSM-IoT
EDGE Enhanced Data rates for GSM Evolution
EEA EPS Encryption Algorithm
eMBB Enhanced Mobile Broadband
eNB E-UTRAN NodeB (Evolved NodeB)
EN-DC E-UTRA-NR Dual Connectivity
ENM Ericsson Network Manager
EPC Evolved Packet Core
ePDCCH enhanced Physical Downlink Control Channel
EPS Evolved Packet System
ERAB E-UTRAN Radio Access Bearer
E-SMLC evolved Serving Mobile Location Center
E-UTRA Evolved UTRA
E-UTRAN Evolved UTRAN
EVM Error Vector Magnitude
FDD Frequency Division Duplex
FFS For Further Study
GBR Guaranteed Bit Rate
GERAN GSM EDGE Radio Access Network
gNB 5G NR Node (Base station in NR)
GNSS Global Navigation Satellite System
GPRS General Packet Radio Service
GSM Global System for Mobile communication
HARQ Hybrid Automatic Repeat Request
HO Handover
HSPA High Speed Packet Access
HRPD High Rate Packet Data
ID Identity
IE Information Element
Inter-RAT Inter Radio Access Technology
IoT Internet of Things
KPI Key Performance Indicator
LLC Logical Link Control
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master Cell Group
MDT Minimization of Drive Tests
MeNB Master eNodeB
MIB Master Information Block
MME Mobility Management Entity
MN Master Node
MS Mobile Station
MSC Mobile Switching Center
MTA Multilateration Timing Advance
MTC Machine Type Communication
NPDCCH Narrowband Physical Downlink Control Channel
NR 5G New Radio or Radio Access for 5G
NR-NSA NR Non-Standalone
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCI Physical-layer Cell Identity
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PDU Protocol Data Unit
PEO Power Efficient Operation
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
QCI Quality of Service Class Indicator
QoS Quality of Service
RA Random Access RACH Random Access Channel
RAN Radio Access Network
RAT Radio Access Technology
RI Rank Information
RLC Radio Link Control
RLM Radio Link Management
RNC Radio Network Controller
RNTI Radio Network Temporary Identifier
ROP Recording Output Period
RRC Radio Resource Control
RRLP Radio Resource Location services Protocol
RRM Radio Resource Management
RS Reference Signal
RSCP Received Signal Code Power
RSRP Reference Symbol Received Power or Reference Signal Received Power
RSRQ Reference Signal Received Quality or Reference Symbol Received Quality
RSSI Received Signal Strength Indicator
RSTD Reference Signal Time Difference
SCG Secondary Cell Group
SCH Synchronization Channel
SCell Secondary Cell
SDU Service Data Unit
SFN System Frame Number
SgNB Secondary gNB
SGSN Serving GPRS Support Node
SGW Serving Gateway
SI System Information
SIB System Information Block
SIPTO Selected IP Traffic Offload
SMLC Serving Mobile Location Center
SN Secondary Node
SNR Signal to Noise Ratio
SON Self Optimized Network
SRB Signalling Radio Bearer
SS Synchronization Signal
SSS Secondary Synchronization Signal
TA Timing Advance
TBF Temporary Block Flow
TDD Time Division Duplex
TDOA Time Difference of Arrival
TLLI Temporary Logical Link Identifier
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network In view of the foregoing, it should be appreciated that embodiments described herein are illustrated by exemplary embodiments. It should also be appreciated that these embodiments are not mutually exclusive. That is, the components from one embodiment may be tacitly assumed to be present in another embodiment and it will be obvious to a person skilled in the art how those components may be used in the other exemplary embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description. Those skilled in the art will appreciate that the use of the term “exemplary” is used herein to mean “illustrative,” or “serving as an example,” and is not intended to imply that a particular embodiment is preferred over another or that a particular feature is essential. Likewise, the terms “first” and “second,” and similar terms, are used simply to distinguish one particular instance of an item or feature from another, and do not indicate a particular order or arrangement, unless the context clearly indicates otherwise. Further, the term “step,” as used herein, is meant to be synonymous with “operation” or “action.” Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that has been set forth and defined within the following claims.

The invention claimed is:

1. A 4G network node configured to interact with a terminal node and a 5G network node, the network node comprising:

a processor; and a memory that stores processor-executable instructions, wherein the processor interfaces with the memory to execute the processor-executable instructions whereby the network node is operable to:

receive, from the terminal node, a B1 measurement report which references a 5G New Radio (NR) cell;

receive at least one of the following: (1) a predetermined number of consecutive SgNB addition request rejections associated with the 5G NR cell; or (2) a predetermined number of consecutive SCG failures associated with the 5G NR cell; and, upon receiving the predetermined number of consecutive SgNB addition request rejections associated with the 5G NR cell or the predetermined number of consecutive SCG failures associated with the 5G NR cell, transmit to the terminal node a Radio Resource Control (RRC) reconfiguration message having at least two parameters: (1) an offset value to be associated with the 5G NR cell and to be added to a Reference Signal Received Power (RSRP) of the 5G NR cell, and (2) a timer value indicating a period of time where the terminal node will not reference the 5G NR cell in a new B1 measurement report.

2. The 4G network node of claim 1, wherein:

the SgNB addition request rejections are received from the 5G network node in SgNBAdditionRequestReject messages; and, the SCG failures are received from the terminal node in RRC SCG Failure Indication messages.

3. The 4G network node of claim 1, wherein:

the offset value has a value of minus infinity; and, the timer value has a range: {0 . . . 100}, a unit: seconds, and utilizes 7 bits.

4. The 4G network node of claim 1, wherein:

the terminal node is an E-UTRA-NR Dual Connectivity (EN-DC) User Equipment (UE);

the 4G network node is a Master eNodeB (MeNB); and, the 5G network node is a SgNB.

5. A method performed by a 4G network node which interacts with a terminal node and a 5G network node, the method comprising:

receiving, from the terminal node, a B1 measurement report which references a 5G New Radio (NR) cell;

receiving at least one of the following: (1) a predetermined number of consecutive SgNB addition request rejections associated with the 5G NR cell; or (2) a predetermined number of consecutive SCG failures associated with the 5G NR cell;

upon receiving the predetermined number of consecutive SgNB addition request rejections associated with the 5G NR cell or the predetermined number of consecutive SCG failures associated with the 5G NR cell, transmitting to the terminal node a Radio Resource Control (RRC) reconfiguration message having at least two parameters: (1) an offset value to be associated with the 5G NR cell and to be added to a Reference Signal Received Power (RSRP) of the 5G NR cell, and (2) a timer value indicating a period of time where the terminal node will not reference the 5G NR cell in a new B1 measurement report.

6. The method of claim 5, wherein:

the SgNB addition request rejections are received from the 5G network node in SgNBAdditionRequestReject messages; and, the SCG failures are received from the terminal node in RRC SCG Failure Indication messages.

7. The method of claim 5, wherein:

the offset value has a value of minus infinity; and, the timer value has a range: {0 . . . 100}, a unit: seconds, and utilizes 7 bits.

8. The method of claim 5, wherein:

the terminal node is an E-UTRA-NR Dual Connectivity (EN-DC) User Equipment (UE);

the 4G network node is a Master eNodeB (MeNB); and, the 5G network node is a SgNB.

9. A terminal node configured to interact with a 4G network node, the terminal node comprising:

a processor; and a memory that stores processor-executable instructions, wherein the processor interfaces with the memory to execute the processor-executable instructions whereby the terminal node is operable to:

transmit, to the 4G network node, a B1 measurement report which references a 5G New Radio (NR) cell; and, receive, from the 4G network node, a Radio Resource Control (RRC) reconfiguration message having at least two parameters: (1) an offset value associated with the 5G NR cell that has been associated with a predetermined number of consecutive SgNB addition request rejections or a predetermined number of consecutive SCG failures, wherein the offset value is to be added to a Reference Signal Received Power (RSRP) of the 5G NR cell; and (2) a timer value indicating a period of time where the terminal node will not reference the 5G NR cell in a new B1 measurement report.

10. The terminal node of claim 9, wherein the terminal node is further operable to:

start the timer; and, add, the offset value to a Reference Signal Received Power (RSRP) of the 5G NR cell, wherein the offset value is set such that the UE would not report the 5G NR cell in the new B1 measurement report while the timer is running.

11. The terminal node of claim 10, wherein the terminal node is further operable to:

determine whether or not the timer has expired;

based on the determination that the timer has expired, remove the offset value from the RSRP of the 5G NR cell which permits the 5G NR cell to be added in the new B1 measurement report transmitted to the 4G network node;

based on the determination that the timer has not expired, determine whether another 5G NR cell has a RSRP satisfying a B1 report threshold;

based on the determination that another 5G NR cell has the RSRP satisfying the B1 report threshold, transmit a new B1 measurement report which references the another 5G NR cell to the 4G network node; and based on the determination that another 5G NR cell does not have the RSRP satisfying the B1 report threshold, wait for the timer to expire and then return to the operation of determine whether or not the timer has expired.

12. The terminal node of claim 9, wherein:

the terminal node is an E-UTRA-NR Dual Connectivity (EN-DC) User Equipment (UE); and, the 4G network node is a Master eNodeB (MeNB).

13. The terminal node of claim 9, wherein:

the offset value has a value of minus infinity; and, the timer value has a range: {0 . . . 100}, a unit: seconds, and utilizes 7 bits.

14. A method performed by a terminal node which interacts with a 4G network node, the method comprising:

transmitting, to the 4G network node, a B1 measurement report which references a 5G New Radio (NR) cell; and, receiving, from the 4G network node, a Radio Resource Control (RRC) reconfiguration message having at least two parameters: (1) an offset value associated with the 5G NR cell that has been associated with a predetermined number of consecutive SgNB addition request rejections or a predetermined number of consecutive SCG failures, wherein the offset value is to be added to a Reference Signal Received Power (RSRP) of the 5G NR cell; and (2) a timer value indicating a period of time where the terminal node will not reference the 5G NR cell in a new B1 measurement report.

15. The method of claim 14, further comprising:

starting the timer; and, adding, the offset value to a Reference Signal Received Power (RSRP) of the 5G NR cell, wherein the offset value is set such that the UE would not report the 5G NR cell in the new B1 measurement report while the timer is running.

16. The method of claim 15, further comprising:

determining whether or not the timer has expired;

based on the determination that the timer has expired, removing the offset value from the RSRP of the 5G NR cell which permits the 5G NR cell to be added in the new B1 measurement report transmitted to the 4G network node;

based on the determination that the timer has not expired, determining whether another 5G NR cell has a RSRP satisfying a B1 report threshold;

based on the determination that another 5G NR cell has the RSRP satisfying the B1 report threshold, transmit the new B1 measurement report which references the another 5G NR cell to the 4G network node; and based on the determination that another 5G NR cell does not have the RSRP satisfying the B1 report threshold, waiting for the timer to expire and then return to the step of determining whether or not the timer has expired.

17. The method of claim 14, wherein:

the terminal node is an E-UTRA-NR Dual Connectivity (EN-DC) User Equipment (UE); and, the 4G network node is a Master eNodeB (MeNB).

18. The method of claim 14, wherein:

the offset value has a value of minus infinity; and, the timer value has a range: {0 . . . 100}, a unit: seconds, and utilizes 7 bits.

* * * * *